(12) United States Patent
Ng et al.

(10) Patent No.: US 7,202,853 B2
(45) Date of Patent: Apr. 10, 2007

(54) REDUCED KEYBOARD SYSTEM THAT EMULATES QWERTY-TYPE MAPPING AND TYPING

(75) Inventors: Edwin Ng, Singapore (SG); Julian Joo Seng Oh, Singapore (SG); Ken Chin Foo Tan, Singapore (SG)

(73) Assignee: Xrgomics Pte, Ltd., Singapore (SG)

( * ) Notice: Subject to any disclaimer, the term of this patent is extended or adjusted under 35 U.S.C. 154(b) by 227 days.

(21) Appl. No.: 10/379,419

(22) Filed: Mar. 4, 2003

(65) Prior Publication Data

US 2003/0193478 A1 Oct. 16, 2003

(30) Foreign Application Priority Data

Apr. 4, 2002 (SG) ............... 200202021-2

(51) Int. Cl.
G09G 5/00 (2006.01)

(52) U.S. Cl. .................. 345/168; 341/22; 400/489

(58) Field of Classification Search ........ 345/168–172; 708/131–146; 341/22–34; 340/407.1, 407.2; 710/67; 400/472–489; 455/186.2; 379/368, 379/433.07

See application file for complete search history.

(56) References Cited

U.S. PATENT DOCUMENTS

| | | | |
|---|---|---|---|
| 3,945,482 A | 3/1976 | Einbinder | |
| 4,333,097 A | 6/1982 | Buric et al. | 340/711 |
| 4,579,470 A | 4/1986 | Casey | |
| 4,824,268 A | 4/1989 | Diernisse H. V. | |
| 4,847,799 A | 7/1989 | Morita et al. | |
| 5,017,030 A | 5/1991 | Crews | |
| 5,128,672 A | 7/1992 | Kaehler | 341/23 |
| 5,187,480 A | 2/1993 | Thomas et al. | |
| 5,581,484 A | 12/1996 | Prince | |
| 5,790,103 A | 8/1998 | Willner | |
| 5,797,098 A | 8/1998 | Schroeder et al. | |

(Continued)

FOREIGN PATENT DOCUMENTS

CA 2290839 11/1999

(Continued)

OTHER PUBLICATIONS

Australian Search Report, Australian Application No. SG 200202021-2, date of issue, Jul. 7, 2005 (3 pages).

*Primary Examiner*—Regina Liang
(74) *Attorney, Agent, or Firm*—Harness, Dickey & Pierce, P.L.C.

(57) ABSTRACT

A reduced keyboard system (100), with a reduced number of keys (13, 15, 23, 25, 102, 104, 106, 108, 110, 112), but retaining the typing map of the conventional QWERTY or QWERTY-type keyboard by employing an intuitive and learning database engine. A plurality of letters, numerals, symbols and functions are assigned to a set of data keys, buttons or data inputs (multi-character keys). The arrangement of the multi-character keys together with the character assignments to the individual multi-character keys allows a user to use the same typing map, as when typing on a conventional QWERTY or QWERTY-type keyboard, be it visual mapping (i.e. physical location of keys) or finger mapping (i.e. touch typing for typist). This enhances the typing experience on the reduced keyboard system to have the same feeling, typing rhythm and speed as typing on a conventional QWERTY or QWERTY-type keyboard.

14 Claims, 13 Drawing Sheets

U.S. PATENT DOCUMENTS

| | | |
|---|---|---|
| 5,818,437 A | 10/1998 | Grover et al. |
| 5,881,169 A | 3/1999 | Henry, Jr. |
| 5,945,928 A | 8/1999 | Kushler et al. |
| 5,953,541 A | 9/1999 | King et al. |
| 5,963,671 A | 10/1999 | Comerford et al. |
| 6,011,554 A * | 1/2000 | King et al. ............... 715/811 |
| 6,103,979 A * | 8/2000 | Motoyama et al. |
| 6,204,848 B1 | 3/2001 | Nowlan et al. |
| 6,219,731 B1 | 4/2001 | Gutowitz |
| 6,232,892 B1 | 5/2001 | Burrell, IV ............... 341/22 |
| 6,286,064 B1 | 9/2001 | King et al. |
| 6,307,549 B1 | 10/2001 | King et al. |
| 6,346,894 B1 | 2/2002 | Connolly et al. |
| 6,597,345 B2 * | 7/2003 | Hirshberg ............... 345/168 |
| 2001/0006587 A1 | 7/2001 | Keinonen et al. |
| 2001/0048378 A1 | 12/2001 | Horie |
| 2001/0048425 A1 | 12/2001 | Partridge |
| 2002/0097227 A1 | 7/2002 | Chu et al. |
| 2003/0038735 A1 * | 2/2003 | Blumberg ............... 341/22 |
| 2003/0107555 A1 * | 6/2003 | Williams ............... 345/169 |
| 2004/0198249 A1 * | 10/2004 | Grifffin ............... 455/90.3 |
| 2005/0053225 A1 * | 3/2005 | Griffin |

FOREIGN PATENT DOCUMENTS

| | | |
|---|---|---|
| CN | 1285540 A | 2/2001 |
| EP | 0307972 | 1/1988 |
| EP | 0 660 218 B1 | 12/1994 |
| GB | 2 347 247 A | 8/2000 |
| GB | 2 363 938 A | 1/2002 |
| JP | 2000041200 A | 2/2000 |
| NL | 1016699 C6 | 12/2000 |
| WO | WO 97/04580 | 2/1997 |
| WO | WO1998/03905 | 1/1998 |

* cited by examiner

REDUCED KEYBOARD SYSTEM THAT EMULATES QWERTY-TYPE MAPPING AND TYPING

FIELD OF THE INVENTION

The invention relates generally to reduced keyboard systems, and more specifically to reduced keyboard systems using memory mapping of QWERTY or QWERTY-type keyboard using a database engine to resolve ambiguous keystrokes and, functional keys to replicate the typing experience.

BACKGROUND

One of the advents of the new era is the surge of online text based communication. Online text based communication, started with the computers and the Internet and continued to gain acceptance and popularity with Short Message Service (SMS). Email is now a de facto form of communication for both personal and business purposes and compact electronic devices are getting smaller, have more functionalities and are more integrated. The singular direction headed by mobile phones, handhelds, personal digital assistants (PDA) and pocket computers is that it must have online text based communication in one form or another, be it emails, SMS or instant messaging (IM).

As devices get smaller, one of the major challenges is to shrink the full QWERTY or QWERTY-like keyboard to a small yet still usable size, or to look at alternate forms of text input, like pen-based text input, handwriting recognition, voice recognition or keyboard alternatives. Pen-based text input is like typing with one finger on a full keyboard, necessitating Artificial Intelligence (AI) to help predict the words, handwriting recognition is relatively slow at best with a long learning cycle. Voice recognition is still in a developing stage and the voice recognition software takes a relatively long time to learn. Additionally, alternative keyboards are conventionally not preferred, and typically used mostly under special circumstances like cord keyboards for the handicapped.

Speed and efficiency wise, keyboard entry is still the fastest and most convenient for text based communication. One of the huge barriers associated with alternative keyboards is the learning curve. An even larger issue for alternative keyboard is the acceptance and how strongly the QWERTY and QWERTY-like keyboard have been favoured in the public. Many other keyboard configurations have appeared like the Dvorak keyboard. Thus, with the heavy and increasing demand for online text based communication, many device manufacturers are forced to using a miniature full-sized QWERTY keyboard. The miniature keyboard, though visually appealing, leaves much to be desired for anything more than casual text input as the keys are too small and too close together.

There have been various attempts to improve the QWERTY keyboard. Basically, there are two main schools of keyboard reduction; the QWERTY keyboard reduction methods and the methods associated with the, already reduced nine keys, numeric phone pad. Of the two, the methods associated with the numeric phone pad appear to be the most comprehensive for user's to use for the treatment of multi-character keys (keys assigned with more than one character or symbol), covering both word- or block-based predictive text input, such as those described in U.S. Pat. Nos. 5,818,437; 5,945,928; 5,953,541; 6,011,554; 6,286,064 and 6,307,549, and the more conventional unambiguous text input methods of multi-tap, two-stroke or multiple-stroke interpretation, like in U.S. Pat. Nos. 6,011,554 and 6,307,549.

The main problems with the numeric phone pad methods are that they are neither QWERTY compatible nor are they specifically designed for rapid typing or double-typing (double-handed and/or double-thumbed). This is because the centre of the design is on the numeric phone pad and not the QWERTY or QWERTY-type keyboard.

With the QWERTY and QWERTY-type keyboards, it is believed that the increasing demands for mobile text input (being able to send text messages everywhere and on the go) will place text input on a much higher priority than numeric input, because of the intensity and extensiveness of usage. Thus, with the merging of the mobile phone and PDA functionalities, even traditional numeric-geared apparatus like the mobile phone will need a typing enabled (as similar to QWERTY typing as possible) text-input function.

Prior art QWERTY keyboard reduction methods range from chord type keyboards and ergonomic arrangement of keys, as that disclosed in U.S. Pat. Nos. 5,017,030; 4,847, 799; 4,824,268; 4,579,470; 3,945,482; 5,790,103 and U.S. patent application No. 20010006587, are either difficult to learn (chord), not QWERTY compatible, not intuitive enough for fast learning, use too many keys, do not have strong multi-character keys treatment (needs colour coding, additional control keys or are two-stroke interpretations) and/or advocate single hand typing.

Thus, there is a need for a keyboard that not only reduces the number of keys to 10 or 12, but continues to utilise a similar memory mapping as the QWERTY or QWERTY-type configuration, and allowing for double-typing (double-handed and/or double-thumbed), thus making it both fast to learn, and fast to input.

SUMMARY

An aspect of the invention provides a reduced keyboard system for inputting information comprising a plurality of keys, each key having at least one feature wherein the feature is a data value, a function or a data symbol representative of a keystroke on a QWERTY-type keyboard wherein the key is assigned a keystroke of a QWERTY-type keyboard based on a mapping arrangement of a section comprised of adjacent keys of a QWERTY-type keyboard compatible with the memory mapping used by a user on a QWERTY-type keyboard; a database for storing data wherein the data is a data character or a data symbol associated with an input keystroke sequence of the keys; and a display for displaying the information.

Another embodiment may further comprise a first set of keys within the plurality of keys wherein a feature of each key of the first set of keys is a data value representative of a key-character of a QWERTY-type keyboard; and a second set of keys within the plurality of keys wherein a feature of each key in a second set keys is a function based on auxiliary functions. The mapping arrangement may also be based on a visual-mapping arrangement of the QWERTY-type keyboard, the first set having less than seven keys and the second set having at least two keys.

Additionally, each column may be arranged to be accessible by at least one of the fingers of each hand of a user for two hand typing, the first set having a first key arranged to be accessible by a first finger of the left hand of a user, the first key having features representing at least the alphabetic characters Q, W, E, R, and T; a second character key arranged to be accessible by a second finger of the left hand of a user, the second key having features representing at least the alphabetic characters A, S, D, F, and G; a third character key arranged to be accessible by a third finger of the left hand of a user, the third key having features representing at least the alphabetic characters Z, X, C, and V; a fourth character key arranged to be accessible by a first finger of the right hand of a user, the fourth key having features representing at least the alphabetic characters Y, U, I, O, and P; a fifth character key arranged to be accessible by a second finger of the right hand of a user, the fifth key having features representing at least the alphabetic characters H, J, K, and L; a sixth character key arranged to be accessible by a third finger of the right hand of a user, the sixth key having features representing at least the alphabetic characters B, N, and M.

Another embodiment of the reduced keyboard system wherein each column is arranged to be accessible by at least one of the fingers of each hand of a user for two hand typing, the first set having: a first key arranged to be accessible by a first finger of the left hand of a user, the first key having features representing at least the alphabetic characters Q, W, E, R, and T; a second character key arranged to be accessible by a second finger of the left hand of a user, the second key having features representing at least the alphabetic characters A, S, D, F, and G; a third character key arranged to be accessible by a third finger of the left hand of a user, the third key having features representing at least the alphabetic characters Z, X, C, V, and B; a fourth character key arranged to be accessible by a first finger of the right hand of a user, the fourth key having features representing at least the alphabetic characters Y, U, I, O, and P; a fifth character key arranged to be accessible by a second finger of the right hand of a user, the fifth key having features representing at least the alphabetic characters H, J, K, and L; a sixth character key arranged to be accessible by a third finger of the right hand of a user, the sixth key having features representing at least the alphabetic characters N and M.

Another mapping arrangement may be based on a touch-type-mapping arrangement of the QWERTY-type keyboard, the first set having less than nine keys and the second set having at least two keys. For this arrangement, the keys of the first set may represent corresponding sections of the QWERTY-type keyboard, wherein the sections on the QWERTY-type keyboard are arranged in less than three columns and at least three rows.

Additionally, each column may be arranged to be accessible by at least one of the fingers of each hand of a user for two hand typing, the first set having a first key arranged to be accessible by a first finger of the left hand of a user, the first key having features representing at least the alphabetic characters Q, A, and Z; a second character key arranged to be accessible by a second finger of the left hand of a user, the second key having features representing at least the alphabetic characters W, S, and X; a third character key arranged to be accessible by a third finger of the left hand of a user, the third key having features representing at least the alphabetic characters E, D, and C; a fourth character key arranged to be accessible by a fourth finger of the left hand of a user, the fourth key having features representing at least the alphabetic characters R, F, V, T, G, and B; a fifth character key arranged to be accessible by a first finger of the right hand of a user, the fifth key having features representing at least the alphabetic characters Y, H, N, U, J, and M; a sixth character key arranged to be accessible by a second finger of the right hand of a user, the sixth key having features representing at least the alphabetic characters I and K; a seventh character key arranged to be accessible by a third finger of the right hand of a user, the seventh key having features representing at least the alphabetic characters O and L; and an eighth character key arranged to be accessible by a fourth finger of the right hand of a user, the eighth key having features representing at least the alphabetic character P.

A variant of the above would be that the first and second character keys may be a single character key accessible by the first finger of the left hand of a user, and the seventh and eighth character keys are a single character key accessible by the third finger of the right hand of a user.

Additionally, the reduced keyboard system may have each column arranged to be accessible by at least one thumb of a user for thumb typing.

Another aspect of the invention provides a method of inputting for a reduced keyboard system comprising the steps of: pressing a first key in a plurality of keys wherein each key having at least one feature wherein the feature is a data value or a function representative of a keystroke on a QWERTY-type keyboard wherein the key is assigned a keystroke based on a mapping arrangement of a section comprised of adjacent keys of a QWERTY-type keyboard compatible with the memory mapping used by a user on a QWERTY-type keyboard; matching a keystroke sequence pressed with a stored keystroke sequence in a database, the stored keystroke sequence having associated data stored in the database wherein the associated data is a data character, a function, or a data symbol associated with the stored keystroke sequence comprising a feature from each key in the keystroke sequence; and displaying on a display information representative of the associated data stored in the database for the keystroke sequence.

An embodiment may further comprise the steps of cycling between associated data; and selecting data displayed. The order of the associated data of the matching step may have an order of the most recently selected data to the least recently selected data. Additionally, the associated data of the matching step may be stored in the database for each digraph association of the features of the preceding selected key in the keystroke sequence.

Another embodiment may have the associated data of the matching step that comprises additional data based on a next potential keystroke in the keystroke sequence pressed wherein no stored keystroke sequence matches the keystroke sequence pressed. The matching step may have no stored keystroke sequence matching any next potential keystroke in the keystroke sequence pressed, no additional information is displayed.

BRIEF DESCRIPTION OF THE DRAWINGS

These and other features, objects, and advantages of embodiments of the invention will be better understood and readily apparent to one of ordinary skill in the art from the following description, in conjunction with drawings, in which.

DETAILED DESCRIPTION

Figure 1:
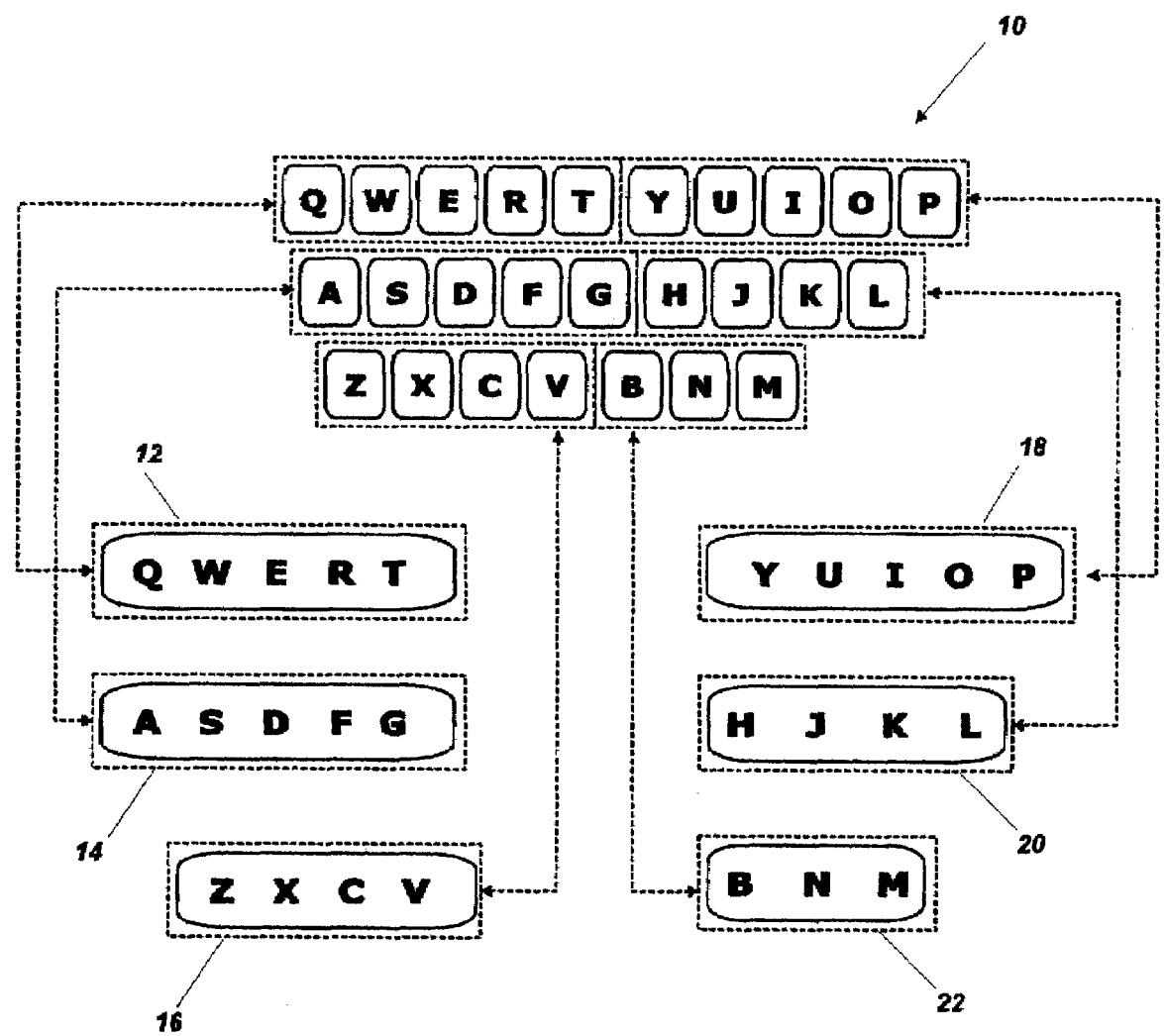
FIG. 1 shows how a QWERTY, and likewise a QWERTY-type, keyboard is mapped visually by the user, and how it could be segmented into six sections and the segmented characters assigned into six multi-character keys in accordance with an embodiment of the invention.

Throughout this description, the embodiments shown should be considered as examples, rather than as limitations on the present invention.

The reduced keyboard system is a concept keyboard design that uses a minimum of keys to represent the entire QWERTY or QWERTY-type keyboard, which includes keyboards for other languages for example French and German, by employing an intuitive database engine. The idea and purpose of an embodiment of the invention is to have a keyboard design that uses a minimum of keys for text and numerals input, uses the same memory mapping (for the user) as that required for QWERTY or QWERTY-type keyboards, allows for fast typing with two hands and/or two thumbs, be able to accommodate commonly used keyboard functions like shift and backspace and easily adoptable or used with any word library and character library. An application for the invention may be used for small, medium devices like mobile devices, personal digital assistants (PDA), handhelds, pocket personal computers (PC), mobile phones, console devices or in places or situations where textual input is restricted and also for keypad-less devices like glove input devices. Of course it will be appreciated that an application of an embodiment of the invention may be implemented as a virtual keyboard in touch screens and pen based applications and/or devices.

The embodiments depicted in the drawings, and the system discussed herewith may generally be implemented in and/or on computer architecture that is well known in the art. The functionality of the embodiments of the invention described may be implemented in either hardware or software. In the software sense, components of the system may be a process, program or portion thereof, that usually performs a particular function or related functions. In the hardware sense, a component is a functional hardware unit designed for use with other components. For example, a component may be implemented using discrete electrical components, or may form a portion of an entire electronic circuit such as an Application Specific Integrated Circuit (ASIC). There are numerous other possibilities that exist, and those skilled in the art would be able to appreciate that the system may also be implemented as a combination of hardware and software components.

Personal computers or computing devices are examples of computer architectures that embodiments may be implemented in or on. Such computer architectures comprise components and/or modules such as central processing units (CPU) with microprocessor, random access memory (RAM), read only memory (ROM) for temporary and permanent, respectively, storage of information, and mass storage device such as hard drive, memory stick, diskette, or CD ROM and the like. Such computer architectures further contain a bus to interconnect the components and control information and communication between the components. Additionally, user input and output interfaces are usually provided, such as a keyboard, mouse, microphone and the like for user input, and display, printer, speakers and the like for output. Generally, each of the input/output interfaces is connected to the bus by the controller and implemented with controller software. Of course, it will be apparent that any number of input/output devices may be implemented in such systems. The computer system is typically controlled and managed by operating system software resident on the CPU. There are a number of operating systems that are commonly available and well known. Thus, embodiments of the present invention may be implemented in and/or on such computer architectures.

The reduced keyboard system can be implemented either by software, hardware or a hybrid of both. Generally, if its implemented purely via software, for example in a softkey (e.g. touch screen) implementation, the device that the reduced keyboard system is implemented on typically has an Operating System, a BIOS (Basic Input/Output System), a display and an input mechanism (e.g. touch screen and stylus). Then the software for the reduced keyboard system may include a software program (that covers the methodology) written in a programming language supported by the operating system and a populated database, that covers the library and library query.

If the reduced keyboard system is implemented in hardware, for example as a hardkey accessory, then the hardware may encompass a processor, a memory module like ROM/EPROM, an input mechanism such as buttons, keys, sensors and the like, and an interface socket to the device such as mobile devices, PDA, handheld computers, mobile phones, console devices and the like. Of course, the display could either be configured on the reduced keyboard system hardware or on the device. Various combinations are possible. The program and database could be stored in the memory modules and the processor a generic microprocessor that runs the program in the memory and relays the information to the display and interface socket. The program could also be mapped to the processor for example as in a digital signal processor (DSP) and the database stored in the memory module. Generally, the processor is the main central unit. On inputting on the input mechanism, a signal is sent to the processor. The processor may either process the signal for example if the program is stored in the processor or it will query the memory and process the information in the memory with regards to the signal from the input/output device. The processor of the hardware solution of the reduced keyboard system will then output signals to the display and/or via the interface socket to the device for example PDA, hardware accessory, and the like. The processor may store or delete data from the memory, for example to store new words or remove words.

As a hybrid solution, the memory in the implemented device, for example a PDA or the like, could be used to store the program and database via a software or software driver and using the device's processor to process the program as similar to the first case discussed above. The hardware may include an input mechanism such as buttons, keys, sensors and an interface. If the input mechanism is built onto the device for example with additional buttons, then the interface may simply be wires or wireless means that connect and communicate to the device. If the input mechanism is on an external device, such as an accessory, then the interface may be like an interface socket like in the second case discussed above, and the display may be implanted on the hardware solution like in the accessory or using the display of the device.

Of course, to implement the reduced keyboard system in hardware, there may be connecting wires like circuit boards to house the circuitry, processors, memory, etc, and a housing that mounts the entire hardware part like buttons, display and the circuit board.

Mapping

Two embodiments are described for memory (user) mapping configurations to the reduced keyboard system. One is for users that have visually mapped (remembers the physical location of the character keys) out the QWERTY or QWERTY-type keyboard and the other for typists that have mapped their fingers to the QWERTY or QWERTY-type keyboard configuration.

The reduced keyboard system maps the keys such that existing users of the QWERTY or QWERTY-type keyboard that either visually map (VM) the keyboard layout or finger map (FM) the keys, are able to quickly adapt to the new keyboard without the necessity of having go through a long learning cycle. Prior art alternatives for a simplified text input system usually necessitate a longer learning cycle or do not utilise the same memory mapping used for typing on a conventional keyboard (e.g. handwriting recognition, symbol writing systems where the user write characters by drawing shapes and symbols on a pad, and tap-on-QWERTY pen based input systems).

Prior art QWERTY keyboard reduction methods range from chord type keyboards and ergonomic arrangement of keys, as that disclosed in U.S. Pat. Nos. 5,017,030; 4,847,799; 4,824,268; 4,579,470 and 3,945,482 are either difficult to learn (chord) or are not QWERTY compatible. Keyboard designs that attempted to be QWERTY compatible, like those in U.S. Pat. No. 5,790,103 and U.S. pat. application No. 20010006587, are either not intuitive enough for fast learning, continue to use too many keys, do not have strong multi-character keys treatment (needs colour coding, additional control keys or are two-stroke interpretations) and/or advocates single hand typing. The present invention, not only utilises the same typing memory for the user (both typist and non-typist), as used when typing on a QWERTY keyboard, but the arrangement of keys is also heavily suited to use or complement that memory. This contributes to the present invention being intuitive to type and easy to learn.

Visual Mapping (VM) Reduced Keyboard System

FIG. 1 shows how a QWERTY, and likewise a QWERTY-type, keyboard 10 is mapped visually by the user, and how it could be segmented into six sections 12, 14, 16, 18, 20, 22 and the segmented characters assigned into six multi-character keys.

Thus, for the VM reduced keyboard system, the multi-character keys could be mapped as follows for a QWERTY keyboard:

Key1—QWERT
Key2—YUIOP
Key3—ASDFG
Key4—HJKL
Key5—ZXCV
Key6—BNM

There are no restrictions to how the keyboard is divided into the six segments. The reduced keyboard system is able to function with any configuration of the multi-character keys and thus the essential purpose of the segmentation is for the user to retain and use the same memory mapping as he would if he was typing using a visual mapping of a conventional keyboard. Thus, the multi-character keys for the VM reduced keyboard system could also be mapped as:

Key1—QWERTY
Key2—UIOP
Key3—ASDF
Key4—GHJKL
Key5—ZXC
Key6—VBNM

There are also no restrictions on the multi-character keys to not being able to share character assignments. This is especially true for the segment border characters that could be assigned to either the left or right multi-character keys.

Thus, the multi-character keys could be assigned the same segment border characters. This is easily handled by the word library database by having the same word indexed to two possible keystroke sequences. Thus, the multi-character keys for the VM reduced keyboard system could also be mapped as (underlined characters are segment border characters):

Key1—QWERTY
Key2—TYUIOP
Key3—ASDFGH
Key4—GHJKL
Key5—ZXCVB
Key6—VBNM

Finger Mapping (FM) Reduced Keyboard System

Figure 2:
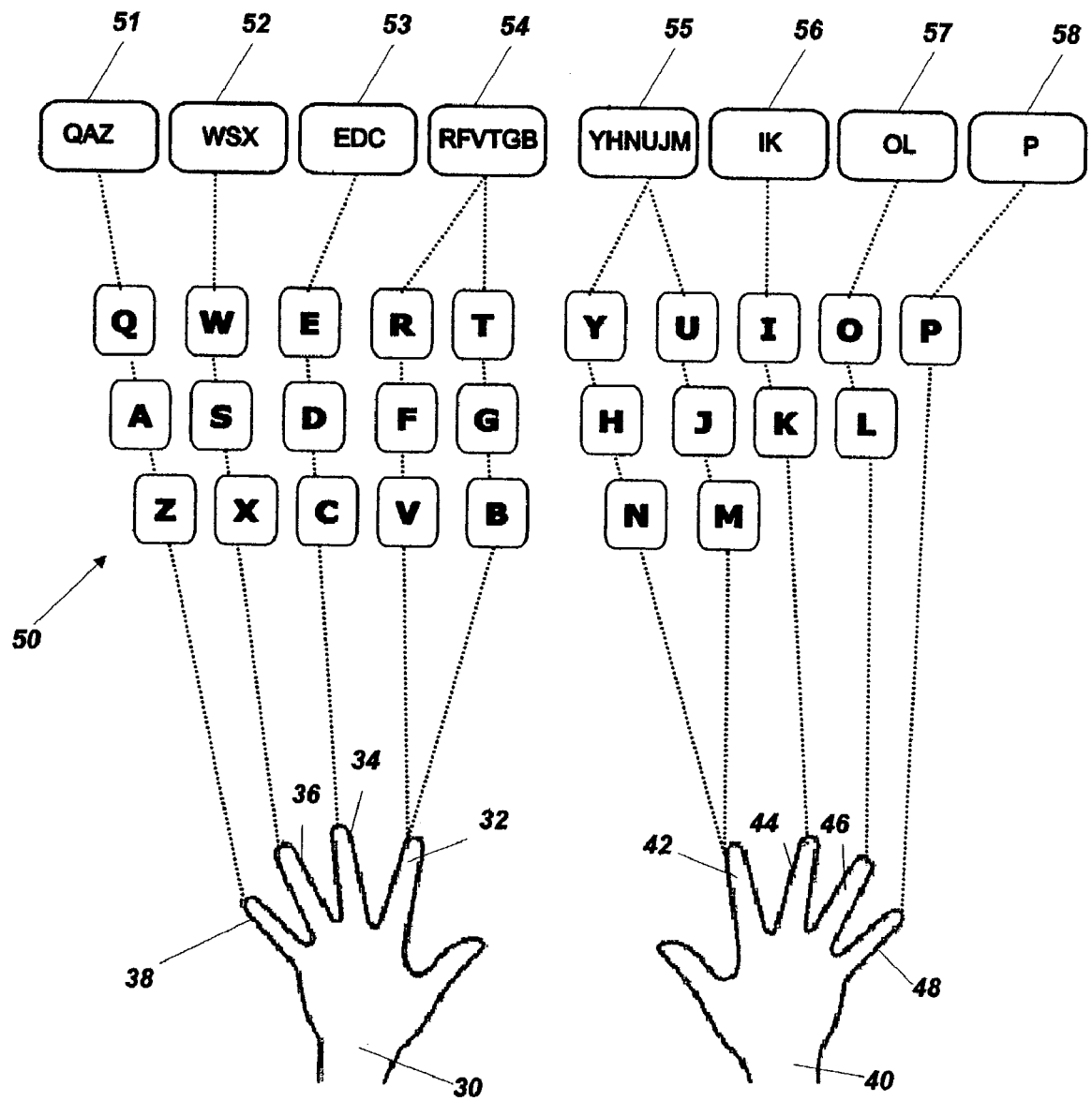
FIG. 2 shows how a QWERTY, and likewise a QWERTY-type, keyboard maps eight fingers for touch typing, and how the same finger mapping could be assigned into eight multi-character keys in accordance with an embodiment of the invention.

For the FM reduced keyboard system, the keys are mapped as per the finger assignments for touch typing on a QWERTY or QWERTY-type keyboard. FIG. 2 shows how a QWERTY, and likewise a QWERTY-type, keyboard maps eight fingers, four fingers 32,34,36,38 of the left hand 30, and four fingers 42,44,46,48 of the right hand 40, for touch typing, and how the same finger mapping could be assigned into eight multi-character keys. Thus, in the FM reduced keyboard system 50, the multi-character keys 51,52,53,54, 55,56,57,58 could be mapped as follows for a QWERTY keyboard:

TABLE 1

| Key 1 | Key 2 | Key 3 | Key 4 | Key 5 | Key 6 | Key 7 | Key 8 |
|---|---|---|---|---|---|---|---|
| Q | W | E | R T | Y U | I | O | P |
| A | S | D | F G | H J | K | L | |
| Z | X | C | V B | N M | | | |

Arrangement of Multi-Character Keys

Figure 3:
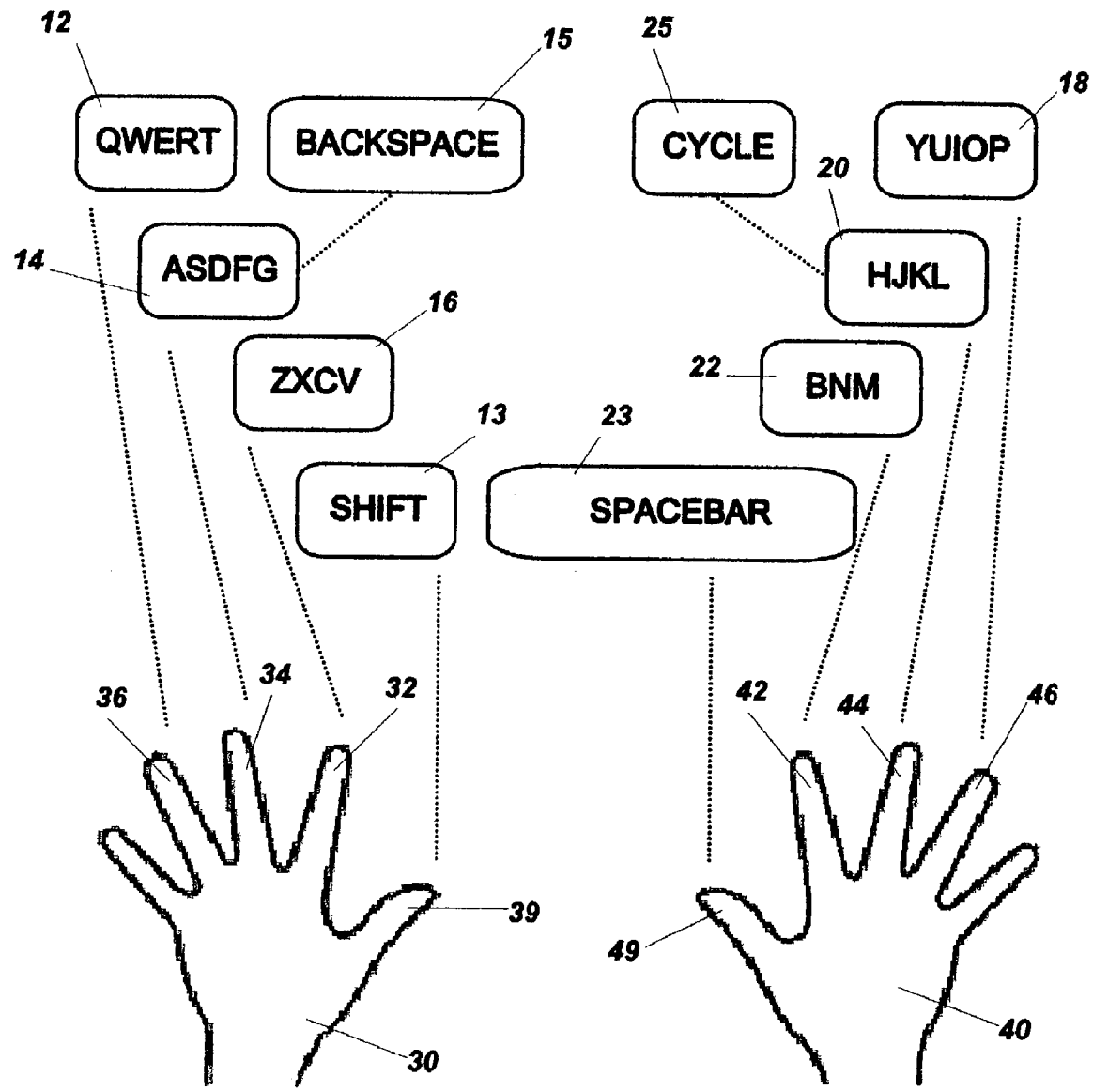
FIG. 3 shows how the multi-character keys for the visual mapping (VM) reduced keyboard system could be arranged in the same visual arrangement as the segmented six sections (two columns and three rows) for the conventional QWERTY or QWERTY-type keyboard in accordance with an embodiment of the invention.

There are two crucial consequences in the arrangement of the multi-character keys. One is to complement the memory (for the user) mapping as discussed above. Thus, for a VM reduced keyboard system, the arrangement of the multi-character keys is similar to the arrangement of the segmented six sections of the QWERTY or QWERTY-type keyboard. FIG. 3 shows how the multi-character keys for the VM reduced keyboard system could be arranged in the same visual arrangement as the segmented six sections (two columns and three rows) for the conventional QWERTY or QWERTY-type keyboard. For example, left thumb 39 may be mapped to Shift Key 13, and right thumb 49 may be mapped to space bar 23. Backspace Key 15 and Cycle Key 25 may be made accessible to any finger or thumb, for example as shown in FIG. 3 fingers 34, 44, respectively.

Figure 4:
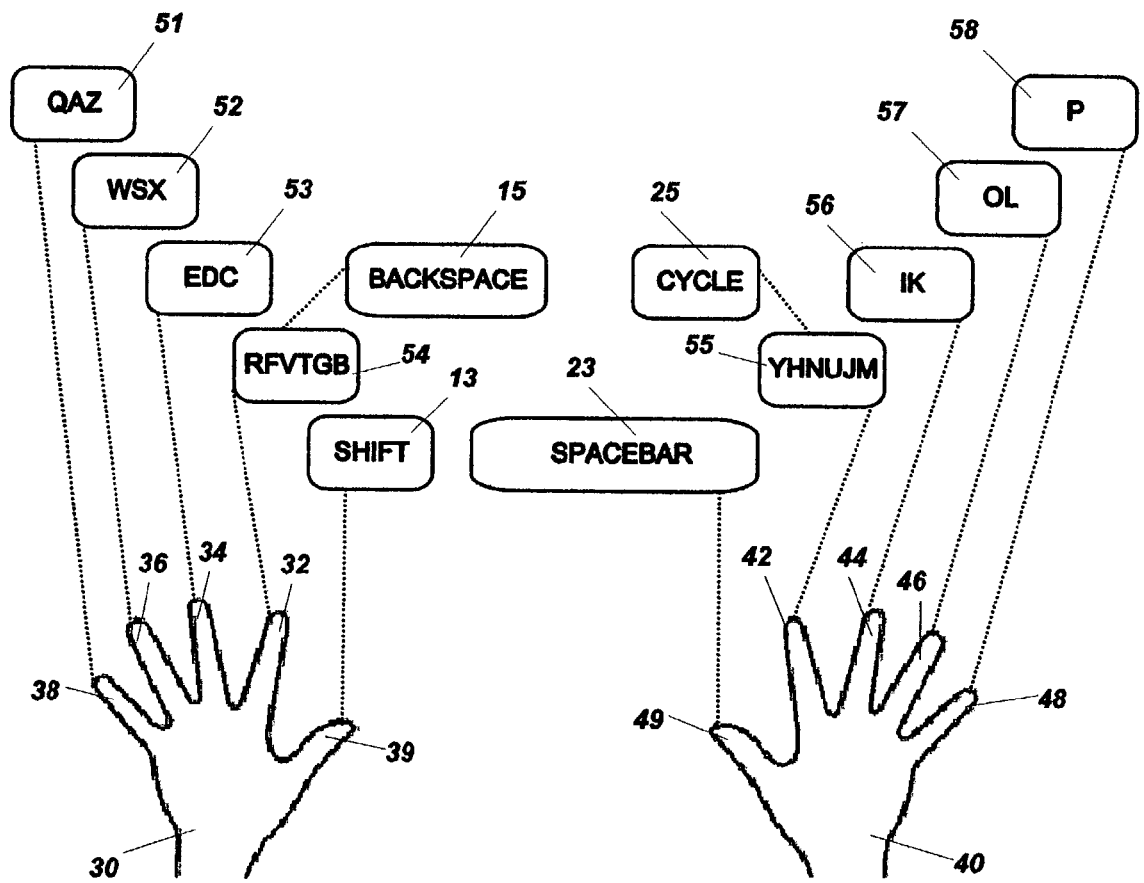
FIG. 4 shows how the multi-character keys for the finger mapping reduced keyboard system could be arranged in the same finger resting arrangement (eight columns and one row) as the QWERTY or QWERTY-type keyboard in accordance with an embodiment of the invention.

For the FM reduced keyboard system, the layout or arrangement of the multi-character keys is similar to the placement of the fingers, when at rest, on a conventional keyboard. FIG. 4 shows how the multi-character keys 51,52, 53,54,55,56,57,58 for the FM reduced keyboard system could be arranged in the same finger resting arrangement (eight columns and one row) as the QWERTY or QWERTY-type keyboard.

The arrangement of the multi-character keys thus reinforces the same memory mapping used by the user when typing on a conventional keyboard and optimises the VM or FM assignments of the multi-character keys.

The second consideration or consequence for the arrangement of the multi-character keys is to allow the implementation of the reduced keyboard system for efficient and fast double-handed and/or double-thumbed typing. Double-handed typing is not catered for in most prior art alternatives for a simplified text input system, except for a miniaturised QWERTY keyboard, which is unwieldy for double-handed typing. This is especially important when textual input features more frequently in modern device usage. For extensive and fast textual input, double-handed typing is still the fastest and most efficient method compared to alternatives like pen-based input, handwriting recognition, and numeric phone keypad based input.

Figure 3A:
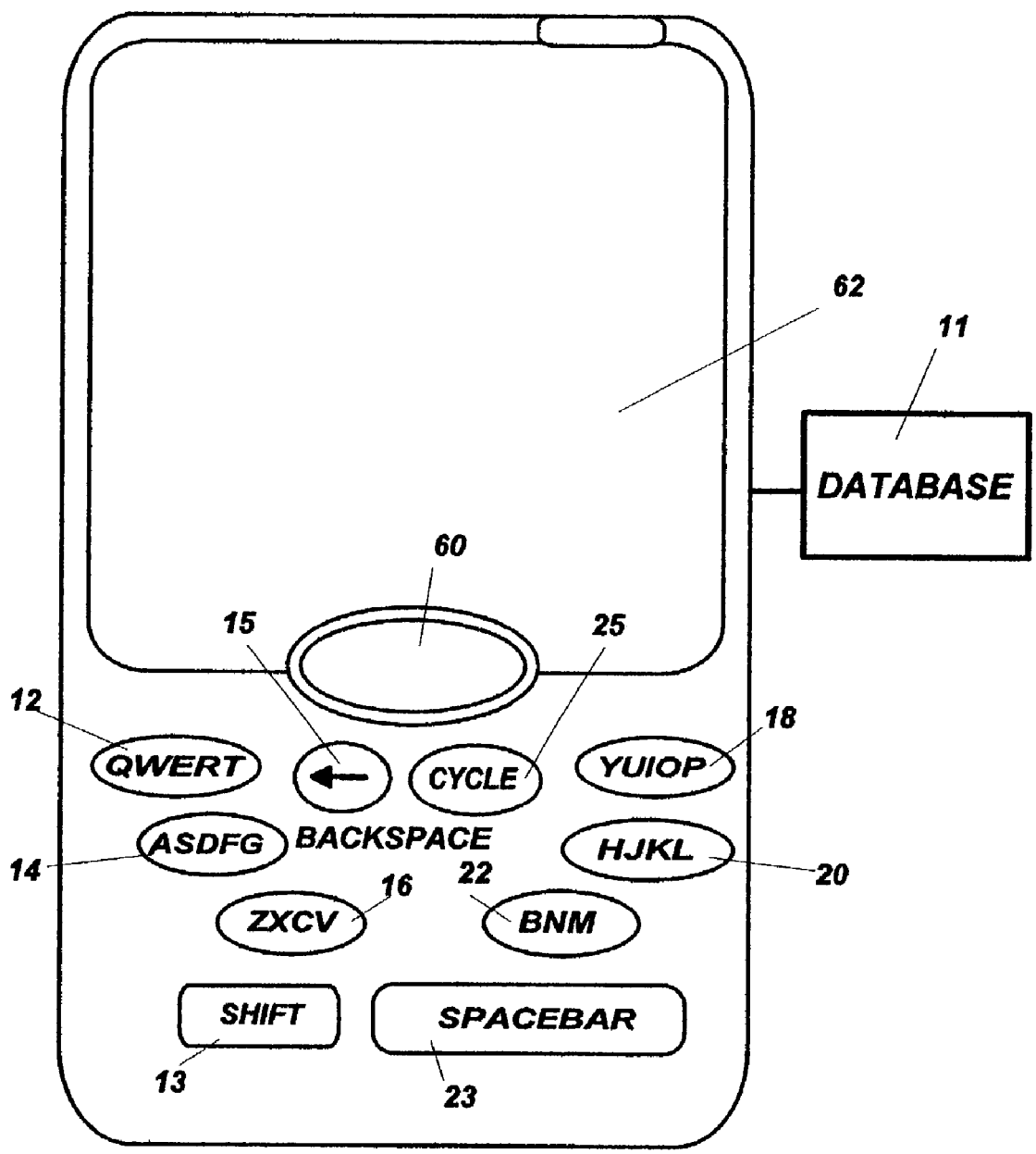
FIG. 3a shows the front view of the preferred embodiment of a keyboard and display of a handheld device in accordance with the present invention, showing an example of how the visual mapping reduced keyboard system (10 keys), using the same visual mapping (physical location of characters) as used for visual typing on a conventional keyboard, could be implemented on a mobile device in accordance with an embodiment of the invention.
Figure 4A:
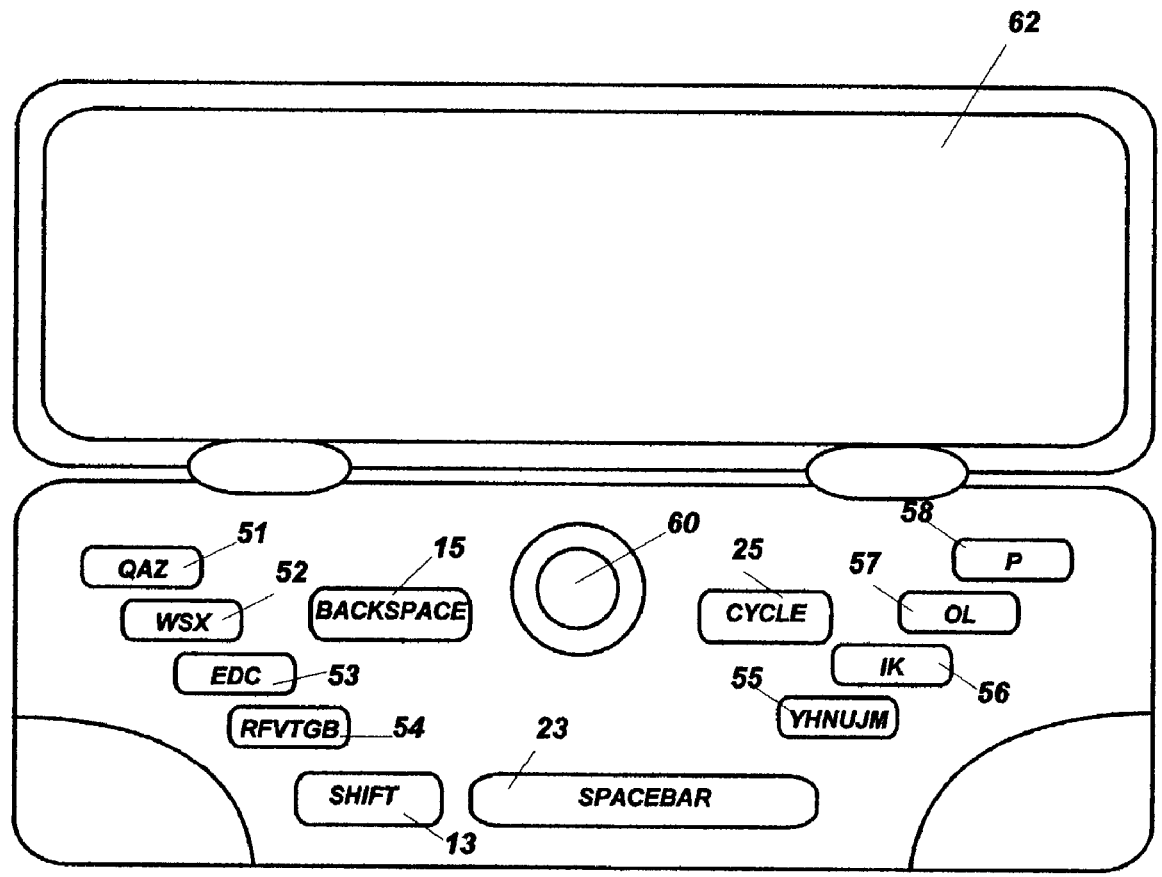
FIG. 4a shows the front view of the preferred embodiment of a keyboard and display of a handheld device in accordance with the present invention, showing an example of how the finger mapping reduced keyboard system (twelve keys), using the same finger mapping as used for touch typing on a conventional keyboard, could be implemented on a mobile device in accordance with an embodiment of the invention.

FIG. 3a shows how the multi-character keys could be arranged on a handheld device that uses the same visual memory mapping as used for visual typing on a conventional keyboard, and also allowing for double-handed or double-thumbed typing. FIG. 3a also shows the database 11, which may be an intuitive database engine residing in the device such as handheld device, to resolve the ambiguity of the set of characters that each multifunction key represents. FIG. 4a shows how the multi-character keys could be arranged on a handheld device that uses the same finger mapping as used for touch typing on a conventional keyboard, and also allowing for double-handed or double-thumbed typing.

Non-Textual and Auxiliary Keys

To complement the multi-character keys, non-textual and auxiliary keys are added to the reduced keyboard system. A preferred embodiment of the non-textual and auxiliary keys would be four non-textual or auxiliary keys to be added to the six multi-character keys in the VM reduced keyboard system to make it a ten keys reduced keyboard system, or added to the eight multi-character keys in the FM reduced keyboard system to make it a twelve keys reduced keyboard system.

The four non-textual or auxiliary keys to be added are spacebar, backspace, shift and cycle keys. FIG. 3 and FIG. 3a shows how the non-textual and auxiliary keys could be arranged on a keyboard and a handheld device respectively, that uses the same visual memory mapping as used for visual typing on a conventional keyboard, and also allowing for double-handed or double-thumbed typing. FIG. 3a also shows an electrostatic glide pad 60 for navigation. FIG. 4 and FIG. 4a shows how the non-textual and auxiliary keys 13,15,23,25 could be arranged on a keyboard and a handheld device respectively, that uses the same finger mapping as used for touch typing on a conventional keyboard, and also allowing for double-handed or double-thumbed typing FIG. 4a also shows a trackball, accupoint or pointing device 60, and an LCD screen 62.

Figure 10:
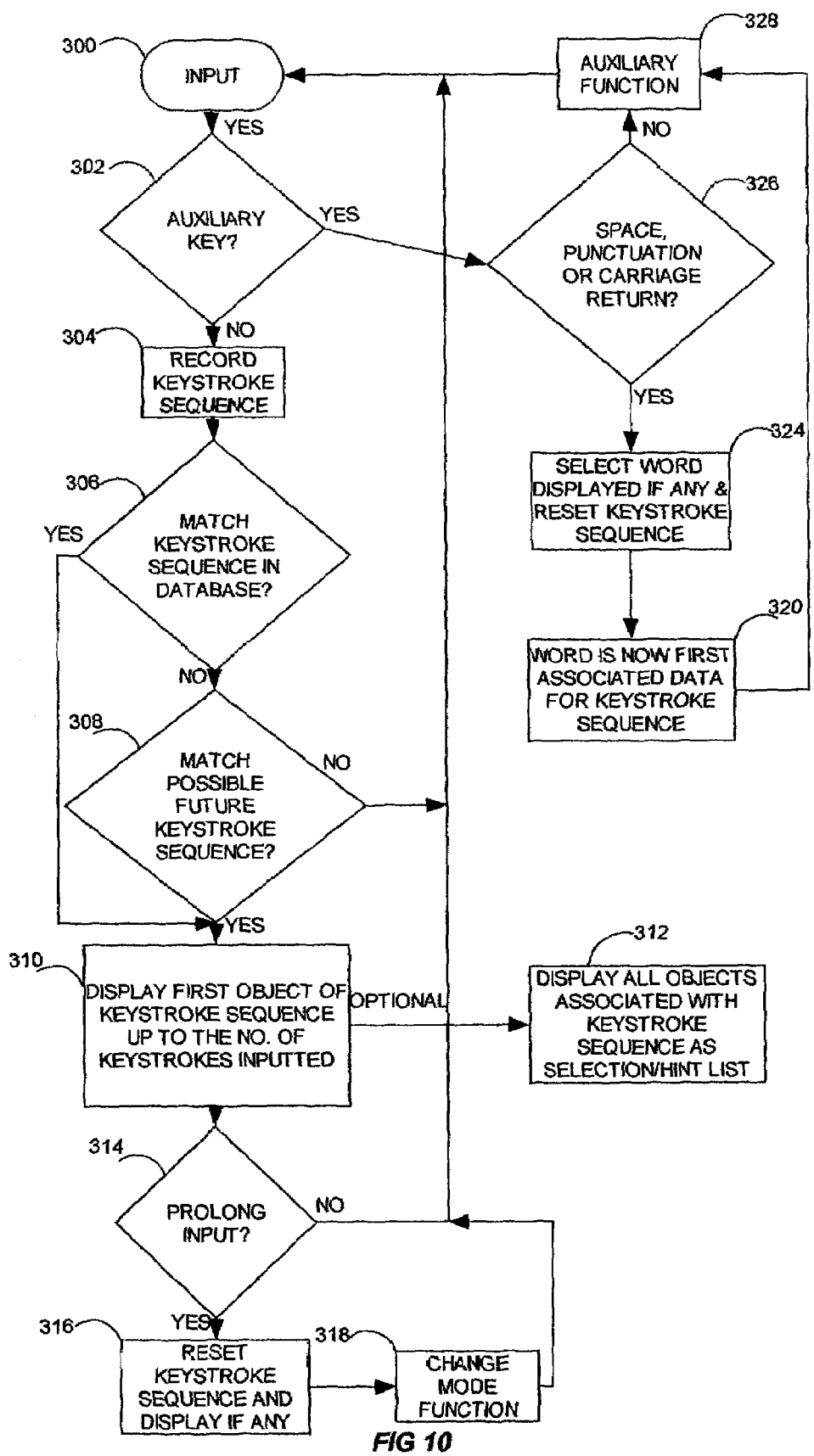
FIG. 10 shows a flowchart of the intuitive text input method in accordance with an embodiment of the invention.
Figure 11:
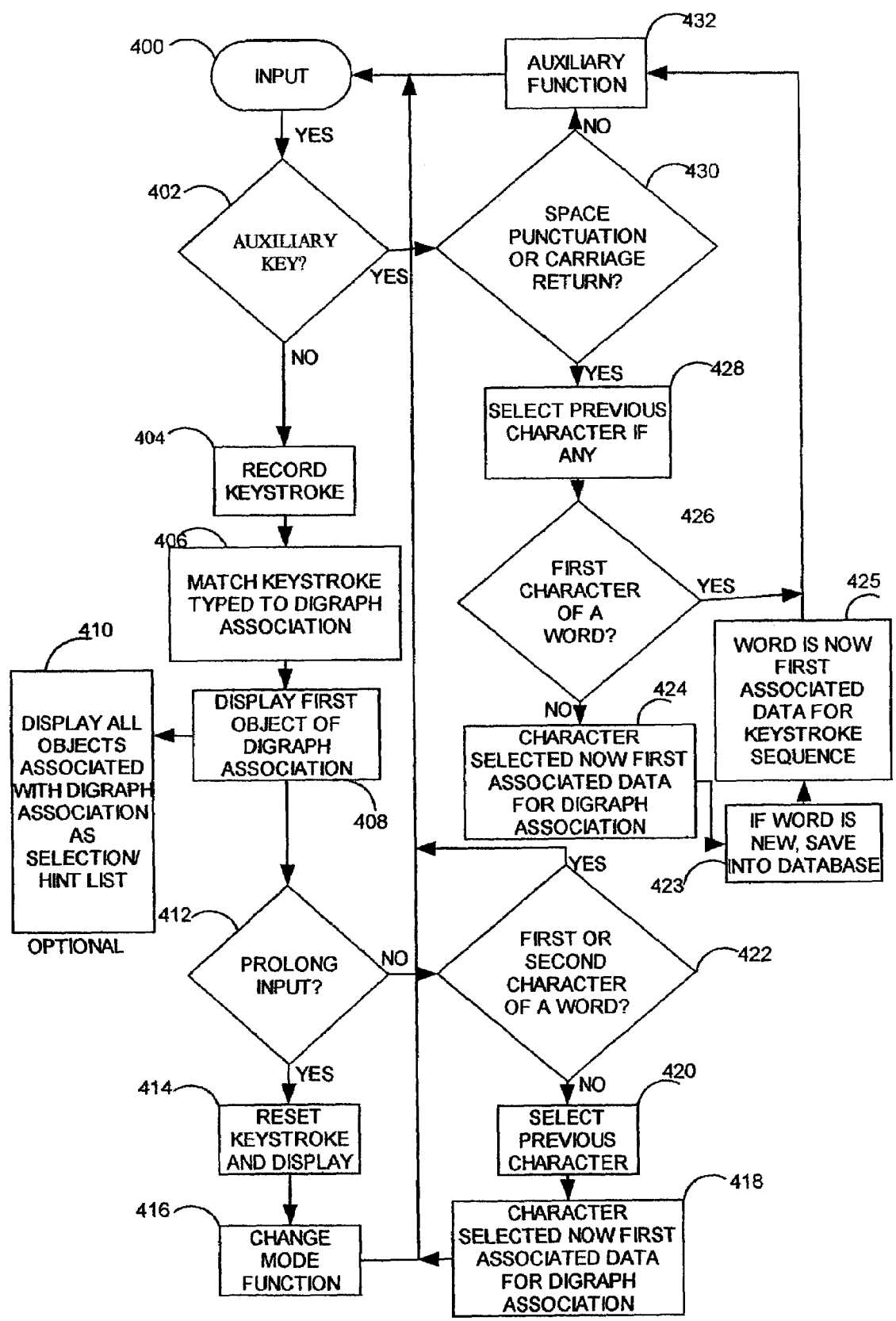
FIG. 11 shows a flowchart of the predictive non-intuitive text input method in accordance with an embodiment of the invention.

The functions of these four keys cover a very wide spectrum of functions especially because of the way they could work in tandem with each other. The preferred functions 328, 432 as shown in FIGS. 10 and 11 of the various keys individually and in tandem could include:

TABLE 2

| Keystroke or Keystroke Sequence | Function(s) |
|---|---|
| Spacebar | Spacebar |
| Backspace | Undo the last character, punctuation, object, symbol or spacebar inputted. |
| Cycle | Cycle forward (through other objects if available) |
| Shift + backspace | Cycle backward or reverse cycle (through other objects if available) |

TABLE 2-continued

| Keystroke or Keystroke Sequence | Function(s) |
|---|---|
| Shift | No effect on its own, has to work in tandem with another key |
| Shift + multi-character keys (in text input mode) | Capitalise the text character that is inputted if not in caps lock mode and vice versa |
| Shift + multi-character keys (in numerals input mode) | The alternate numeral is selected for the two numerals assigned to any multi-character key |
| Shift + cycle | The first object in the punctuation & symbols list is inputted (different list of objects for numerals input mode and text input mode |
| Shift + spacebar | Carriage return |

Of the four auxiliary keys, only the cycle key and spacebar may be required for this embodiment. Thus, for example, the reduced keyboard system may function with six or eight multi-character keys and two non-textual or auxiliary keys. Functions like punctuations, carriage return, and backspace could be replicated by modes changing. In retrospect, even the cycle and spacebar function could be replaced by mode changes, but it would counterman what the invention is trying to achieve for fluid, fast and conventional keyboard-like typing.

Typing Modes and Mode Changing

The reduced keyboard system also caters for a multitude of modes like caps lock, intuitive text input mode, predictive non-intuitive text input mode and numerals input mode (num lock). The versatility and flexibility of the reduced keyboard system is enhanced by the mode changing process. The preferred embodiment is for the default mode to be intuitive text input mode.

Mode changing is performed by pressing a mode change assigned key and holding it for an extended period 314, 412 as shown in FIGS. 10 and 11. Pressing-and-holding the same key a second time will undo the mode change and revert the reduced keyboard system to the previous state (mode). The preferred timing and period for the key to be held before a mode change function is performed instead of the normal function of the key is about 1 sec. Any key could be assigned a mode change function, on top of their normal function. The reduced keyboard system is able to differentiate between a normal tap and an extended or prolonged press-and-hold, by sensing the length of the signal input from an input key, button or input point. If an input was previously recorded and displayed after sensing prolonged press-and-hold, the keystroke sequence and display is reset to the previous state 316, 414 as shown in FIGS. 10 and 11.

Figure 7:
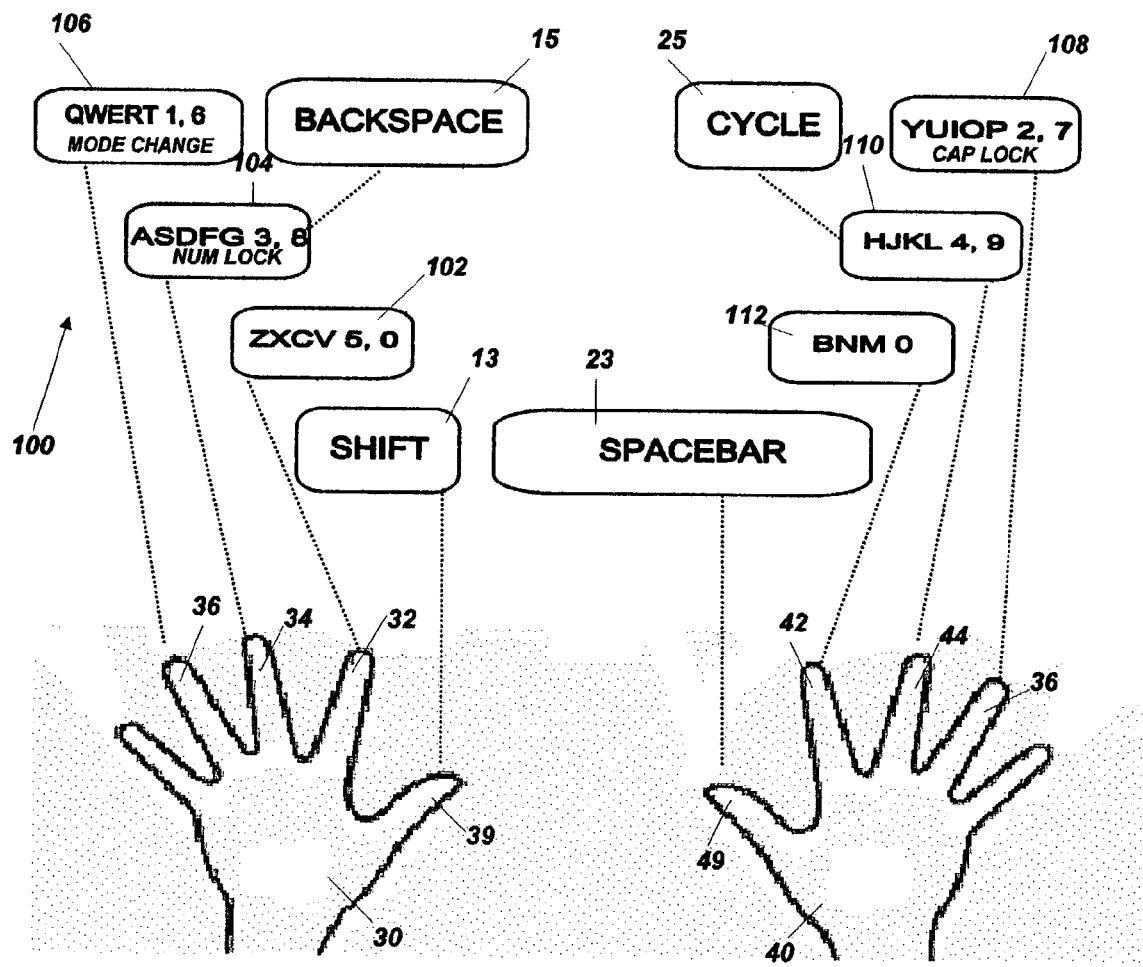
FIG. 7 shows how the multi-character keys could be assigned with mode changing options of predictive non-intuitive text input mode, caps lock mode, and numerals input mode (num lock) on a visual mapping reduced keyboard system in accordance with an embodiment of the invention.
Figure 8:
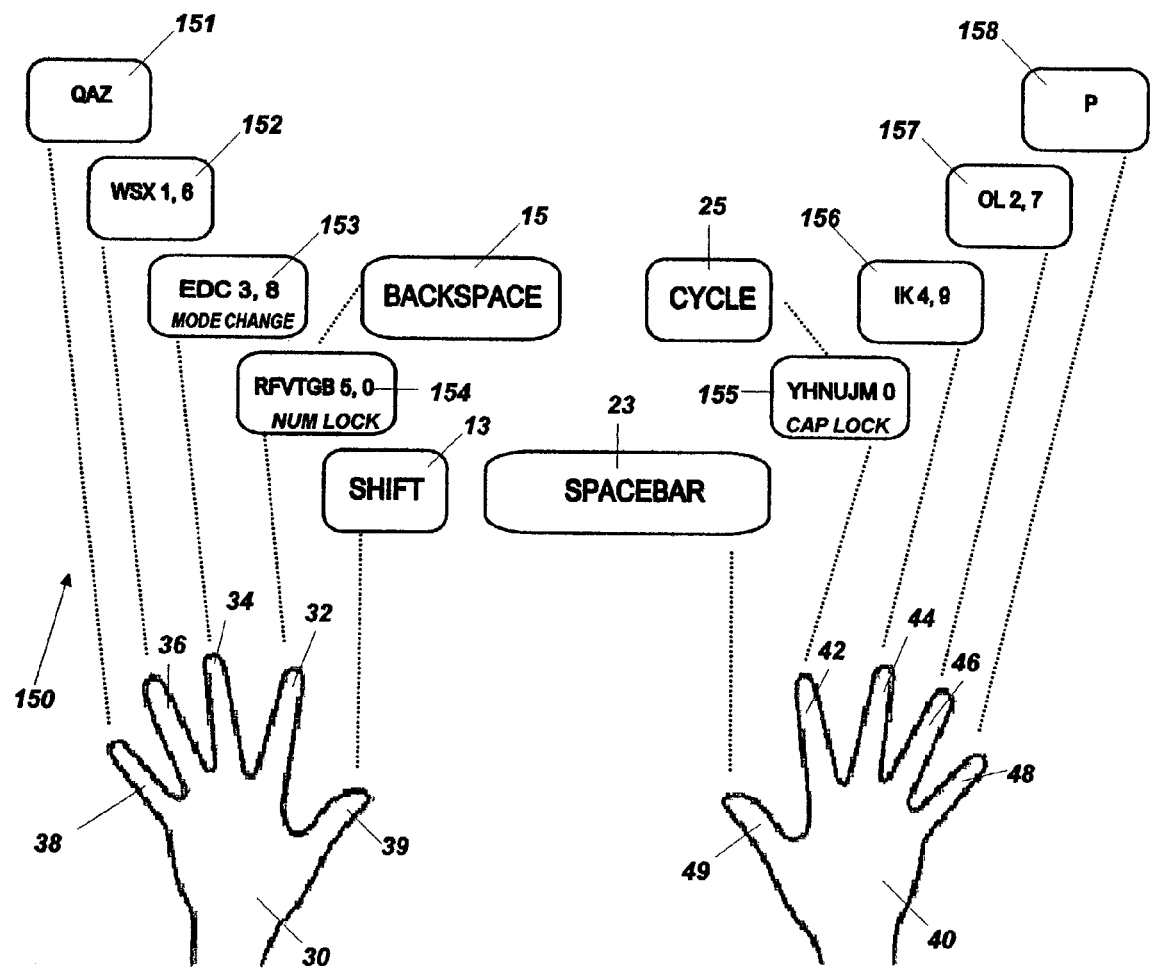
FIG. 8 shows how the multi-character keys could be assigned with mode changing options of predictive non-intuitive text input mode, caps lock mode, and numerals input mode (num lock) on a finger mapping reduced keyboard system in accordance with an embodiment of the invention.

The preferred embodiment of the reduced keyboard system may have the multi-character keys assigned with the mode changing functions of (with the default mode being intuitive text input mode) 318,416 as shown in FIGS. 10 and 11:

a) changing from intuitive text input mode to predictive non-intuitive text input mode, and vice versa when pressed-and-held a second time
b) changing from text input mode to numerals input mode (num lock), and vice versa when pressed-and-held a second time
c) changing to and from caps lock mode during text input mode FIG. 7 shows an embodiment 100 how the multi-character keys 102,104,106,108,110,112 could be assigned with mode changing options of predictive non-intuitive text input mode 106, caps lock mode 108, and numerals input mode (num lock) 104 on a VM reduced keyboard system. FIG. 8 shows an embodiment 150 how the multi-character keys 151,152, 153,154,155,156,157,158 could be assigned with mode changing options of predictive non-intuitive text input mode 153, caps lock mode 155, and numerals input mode (num lock) 154 on a FM reduced keyboard system.

Capitalising and Backspace

Capitalising letters is very similar to the conventional QWERTY or QWERTY-type keyboard. By pressing the shift key and the multi-character key during text input mode (without caps lock), the displayed letter would be in capitals.

"Caps Lock" mode is activated by pressing-and-holding down the caps lock mode assigned key. To switch back to the normal mode, press-and-hold the same key again. In caps lock mode, every character input displayed will be in capitals, unless the shift key is pressed in tandem which would cause a non-capitalised character to be displayed.

Backspace function is again very similar to that for the conventional QWERTY or QWERTY-type keyboard and performed by pressing the backspace key, which will undo the previous character, numeral, symbol, punctuation, object or spacebar input.

Cycling and Lists

When a character, word, object, plurality of objects, numeral, symbol, or punctuation is displayed as one of a list of possible characters, words, objects, plurality of objects, numerals, symbols, or punctuations, subsequent (next possible) characters, words, objects, plurality of objects, numerals, symbols, or punctuations are selected and displayed by pressing the cycle (or cycle forward) key. The cycling process is in a loop, thus, when the last character, word, object, plurality of objects, numeral, symbol, or punctuation is selected and displayed, and the cycle key is pressed again, the first character, word, object, plurality of objects, numeral, symbol, or punctuation will be selected and displayed.

The selection and displayed character, word, object, plurality of objects, numeral, symbol, or punctuation can also be reversed cycled (cycling the character, word, object, plurality of objects, numeral, symbol, or punctuation in the reverse order), if a cycle backward (or reverse cycle) function is implemented (e.g. shift+backspace). Reverse cycling is also in a loop, thus, when the first character, word, object, plurality of objects, numeral, symbol, or punctuation is selected and displayed, and the reverse cycle key (or key combination) is pressed again, the last character, word, object, plurality of objects, numeral, symbol, or punctuation will be selected and displayed.

Lists of characters, words, objects, plurality of objects, numerals, symbols, or punctuations in the reduced keyboard system could either be fixed or learning. Fixed lists will not have the ordering of the characters, words, objects, plurality of objects, numerals, symbols, or punctuations changed on selecting and accepting of a character, word, object, plurality of objects, numeral, symbol, or punctuation. The order of the characters, words, objects, plurality of objects, numerals, symbols, or punctuations could be determined in the beginning for the reduced keyboard system based on how commonly used are the individual characters, words, objects, plurality of objects, numerals, symbols, or punctuations in, relation to the other characters, words, objects, plurality of objects, numerals, symbols, or punctuations in the list.

In the preferred embodiment of the reduced keyboard system, fixed lists are used for the symbols database for text input mode, symbols database for numerals input mode and for first character input in predictive non-intuitive text input mode.

An example of what the symbols database could contain and how it could be ordered, for text input are as shown within the quotient marks:
",|.|?|!|'|@|;|:|–|(|)|"|&|_" where "|" are separators.

An example of what the symbols database could contain and how it could be ordered, for numerals input are as shown within the quotient marks:
".|,|+|–|*|/|=|(|)|$|%|#|<|>" where "|" are separators.

The list for first character of a word input in predictive non-intuitive mode is described in detail in Character Library Database.

Learning lists have the characters, words, objects, plurality of objects, numerals, symbols, or punctuations in the list ordered from most recently used to least recently used or not used. Every time a character, word, object, plurality of objects, numeral, symbol, or punctuation in a learning list is selected 324, 428, 420 by inputting a space, punctuation or carriage return 326, 430 as shown in FIGS. 10 and 11, and accepted, the character, word, object, plurality of objects, numeral, symbol, or punctuation is placed in the front of the list 320, 418, 424, as shown in FIGS. 10 and 11.

Word Library Database

Building the word library database for the intuitive database engine is very simple and easily accommodates and uses any word library for words used on QWERTY or QWERTY-type keyboards. Using any word library, a word library database is easily built that indexes keystroke sequence, as per the assigned multi-character keys, and the words in the word library.

E.g. 1(a) for a VM reduced keyboard system that assigned the characters to the six multi-character keys in the following manner:
Key1—QWERT
Key2—YUIOP
Key3—ASDFG
Key4—HJKL
Key5—ZXCV
Key6—BNM Words like "error", "errors", "tree", "were", "if" and "of" would be built into the word library database as (where "|" are separators):

| Keystroke Sequence | Word(s) |
| --- | --- |
| Key1, Key1, Key1, Key1 | tree\|were |
| Key1, Key1, Key1, Key2, Key1 | error |
| Key1, Key1, Key1, Key2, Key1, Key3 | errors |
| Key2, Key3 | if\|of |

E.g. 1(b) for a VM reduced keyboard system that assigned the characters to the six multi-character keys in the following manner (different multi-character keys assigned with same border segment characters, shown as underlined characters):
Key1—QWERTY
Key2—YTUIOP
Key3—ASDFGH
Key4—GHJKL
Key5—ZXCVB
Key6—VBNM Words like "error", "errors", "tree", "were", "if" and "of" would be built into the word library database as (where "|" are separators):

| Keystroke Sequence | Word(s) |
| --- | --- |
| Key1, Key1, Key1, Key1 | tree\|were |
| Key1, Key1, Key1, Key2, Key1 | error |
| Key1, Key1, Key1, Key2, Key1, Key3 | errors |
| Key2, Key1, Key1, Key1 | tree\|were |
| Key2, Key3 | if\|of |

Prior art ambiguous text input methods, using multi-character keys, such as those described in U.S. Pat. Nos. 5,818,437; 5,945,928; 5,953,541; 6,011,554; 6,286,064 and 6,307,549, have the words sharing the same keystroke sequence ordered in order of decreasing frequency of use, or uses extra auxiliary keys for text input. When frequency of use is utilised as a means of ordering, this would mean at least one more parameter or field per word, compared to the present invention, to keep track of. With a few thousand words in a typical language, this would require a much larger storage space for the database. Also, an additional logic needs be employed for saving the additional information and keeping track of the extra parameter or field. In the case of using an extra auxiliary key for text input, this would make the typing process less intuitive, slows down typing and requires a steeper learning curve, which is contrary to the objectives of the present invention which aims to replicate the smoothness and fluidity of typing on the conventional keyboard. Prior art methods that offer look-ahead capabilities and possible word alternatives, as described in U.S. Pat. No. 6,204,848, also detracts from fluid conventional typing significantly and necessitates additional training, keys (for the word selection) and finger movements (switch from typing to word selecting).

Intuitive Text Input Method

The concept, as shown in FIG. 10, by using multi-character keys to represent several characters (letters), a user need only press the key 300 that contains the letter he wants once and on forming the word, the intuitive database engine will pick the first word that is indexed to the keystroke sequence 304, from a built word library database 306.

If no characters, word or words match or are stored for the keystroke sequence, the next possible "future" keystroke sequence (i.e. keystroke sequence that contains the input keystroke as a subset or sub-keystroke) is located 308 and the first word indexed to that "future" keystroke sequence is picked, displaying 310 the number of characters, up to the number of input keystroke. If there are no next possible "future" keystroke sequence available 308, then pressing on the keystroke has no effect.

If the word is not what the user intends, the user simply cycles 302 through a list of choices, or if the word does not exist in the word library, type in the new word via the predictive non-intuitive text input mode (discussed later) once, and the new word will be thereafter present in the word library database. An option to assist the cycling through a list of choices would be to display all the objects associated with the keystroke sequence as a selection or hint list 312.

E.g. 2 (Using the same character assignments for the six multi-character keys in a VM reduced keyboard system as E.g. 1(a)) and only the words "error", "errors", "tree", "were", "if" and "of" are present in the word library database.

Key1—QWERT
Key2—YUIOP
Key3—ASDFG
Key4—HJKL
Key5—ZXCV
Key6—BNM

| Keystroke Sequence | Word(s) |
| --- | --- |
| Key1, Key1, Key1, Key1 | tree\|were |
| Key1, Key1, Key1, Key2, Key1 | error |
| Key1, Key1, Key1, Key2, Key1, Key3 | errors |
| Key2, Key3 | if\|of |

User Presses Key1:

No word is indexed to keystroke sequence Key1. Database engine searches for the next possible "future" keystroke sequence, which is Key1, Key1, Key1, Key1. The word "tree" (which is first in the order) is picked and the word is displayed up to the number of keystroke inputs which is one.

Display Shows "t" (no Cycling is Possible)

User presses another Key1 (total Key1, Key1):

No word is indexed to keystroke sequence Key1, Key1. Database engine searches for the next possible "future" keystroke sequence, which is Key1, Key1, Key1, Key1. The word "tree" (which is first in the order) is picked and the word is displayed up to the number of keystroke inputs which is two.

Display Shows "tr" (no Cycling is Possible)

User Presses Another Key1 (Total Key1, Key1, Key1):

No word is indexed to keystroke sequence Key1, Key1, Key1. Database engine searches for the next possible "future" keystroke sequence, which is Key1, Key1, Key1, Key1. The word "tree" (which is first in the order) is picked and the word is displayed up to the number of keystroke inputs which is three.

Display Shows "tre" (no Cycling is Possible)

User Presses Another Key1 (Total Key1, Key1, Key1, Key1):

There is a word indexed to keystroke sequence Key1, Key1, Key1, Key1. The word "tree" (which is first in the order) is picked.

Display shows "tree" (cycling is possible. On cycling, the word "were" will be displayed. Cycling another time will cause the word "tree" to be displayed again)

User Tries to Press Another Key1 (Total Key1, Key1, Key1, Key1, Key1):

No word is indexed to keystroke sequence Key1, Key1, Key1, Key1, Key1. A database engine search for the next possible "future" keystroke sequence, and finds none. There is no effect in pressing that Key1.

Display still shows "tree" (cycling is possible. On cycling, the word "were" will be displayed. Cycling another time will cause the word "tree" to be displayed again)

Behind the simple concept is a powerful intuitive database engine that enhances the performance of the reduced keyboard system and intuitive text input.

Intuitive Word Database Engine (Intuitive Text Input Mode)

Intuitive text input mode is used when typing words that are in the word library database. The library is restricted to whatever word library was used to build the word library database and any new words added to the word library database.

The intuitive engine intuitively deduces the word/s that a user is looking for and presents them to the user. If the first word presented is not the correct choice, the user will be able to cycle (choose another word) through the other possibilities by using the cycle key or reverse cycle key (or key combination).

The intuitive word database engine performs the intuitive deduction by arranging the list of words assigned to a keyboard sequence in the order from most recently used to least recently used or not used (i.e. learning list), and for which patent rights are hereby claimed. This significantly reduces the number of times users need to cycle and also the amount of words they need to cycle through to reach the word they want. This also helps to keep, the first few word choices presented to the user in-line with the context of the current conversation, whereby certain words are used very often in a particular topic of discussion (the word will be made to appear first in-queue for that discussion topic) but not in other topics (the word will then be relegated behind new word choices).

The power of learning lists and the intuitive word database engine is that by ordering objects by their most recent use instead of other prior art methods like most frequently used and most commonly used, the invention is able to achieve two key things. One is that obscure words that are used in the current context of the conversation are able to be presented to the top of the list instantly, thus reducing the amount of cycling required. The second is that frequently used words that are not used in the current context of the conversation is quickly moved down the list, so that it would not be presented as the first few word choices, and thus again reducing the amount of cycling required to select the desired word.

Character Library Database

The character library database is used for predictive non-intuitive text input. The character library database for the intuitive database engine is very simple to build and easily accommodates and uses the character library for languages used on QWERTY or QWERTY-type keyboards (i.e. listing of all characters used for the language). Using any character library, a character library database is easily built that indexes keystroke (not keystroke sequence like the word library database), as per the assigned multi-character keys and the digraph association with the characters assigned to the multi-character key.

Digraph Association

Digraph association is the association of a keystroke and the previous character inputted. Thus, if there are 6 multi-character keys as in the VM reduced keyboard system and 26 characters total for the language (e.g. 26 letters for the English language), then each association between a keystroke (multi-character key) and a character is called a digraph association. In this case, there would be 26 multiplied by 6=156 digraph associations.

The logic employed by using digraph association is that some characters are more likely to follow a particular character than another. Thus, the invention uses digraph association, between previous characters and keystrokes, as an index key for the character library database to which are assigned the characters in the character list assigned to a keystroke or multi-character key. In this way, when a keystroke is inputted, the character library database would reference to the digraph association between the keystroke and the previous character inputted and then present the character list in the order stored for that digraph association.

E.g. 3 Example of how digraph association is used for a VM QWERTY reduced keyboard system.

Assume that the character assignments for the multi-character keys are

Key1—QWERT
Key2—YUIOP
Key3—ASDFG
Key4—HJKL
Key5—ZXCV
Key6—BNM

They are thus 26 characters in total and 6 multi-character keys. This would mean that there are 156 digraph associations in total. The character database that is built could then look like (where "|" are separators and "x", Key"y" is the digraph association between keystroke, Key"y" and a previous inputted character, "x"):

| Digraph Association | Characters |
|---|---|
| a, Key1 | r\|t\|q\|e\|w |
| a, Key2 | i\|u\|y\|p\|o |
| a, Key3 | d\|s\|a\|f\|g |
| a, Key4 | h\|l\|k\|j |
| a, Key5 | z\|c\|v\|x |
| a, Key6 | n\|m\|b |
| b, Key1 | r\|e\|t\|w\|q |
| b, Key2 | o\|i\|u\|p\|y |
| . | |
| . | |
| . | |
| z, Key5 | c\|v\|x\|z |
| z, Key6 | n\|m\|b |

Thus, if a user inputs or selects the character "a" and then presses key 1, the character "r" would be selected and displayed first (by referencing to digraph association a, Key1). If the user presses the cycle key (cycle forward) repeatedly, he would then be presented, in place of the character "r", the characters "t", "q", "e", "w", "r", "t", "q" . . . respectively and sequentially.

As it can be seen in the example, Key2 has a different digraph association with the previous inputted character "a" compared to the digraph association it has with previous inputted character "b". In this example, the letter "i" is most likely to follow a previous input character of "a", while the letter "o" is most likely to follow a previous input character of "b".

By indexing the character library database to digraph association, the database engine will more accurately predict the character required by the user, when the ambiguous multi-character key is pressed in predictive non-intuitive text input mode.

Tap-and-Cycle Method

Characters in the predictive non-intuitive text input mode are selected using the tap-and-cycle method. As can be seen in E.g. 3, the user first taps on the multi-character key, and he is presented with the first object for that digraph association and keystroke. If it is not the character the user wants, the user proceeds with cycling through the list using the cycle key or reverse cycle key (or key combination). The user accepts the character being selected and displayed by pressing any multi-character key, spacebar, symbol, punctuation or inputting any character, characters, word, numeral or object.

The tap-and-cycle method is unlike other methods of unambiguous multi-character key input methods like the multi-tap method, where a user repeatedly taps on the same multi-character key to select through the character list assigned to the multi-character key. This is because when two subsequent characters to be inputted are assigned to the same multi-character key, the multi-tap method must either employ a time delay so that multi-tapping on the same multi-character key again would yield a new character instead of the normal cycling function, or the user must press a character acceptance key (to accept the first character) before multi-tapping the same multi-character key again for the second character.

In the tap-and cycle method, a user typing two characters that are assigned to the same multi-character key, simply taps the multi-character key, cycle with the cycle or reverse cycle key, and then tap on the multi-character key again and cycle with the cycle or reverse cycle key again. There is no need for the implementation of a time delay or character acceptance key.

Prior art methods for unambiguous text input, using multi-character keys, uses multi-tap, two-stroke or multiple-stroke interpretation, like in U.S. Pat. Nos. 6,011,554; 6,307,549, or auxiliary multi-tap (an auxiliary key is used with multi-tap), as described in U.S. Pat. No. 6,219,731. The reduced keyboard system is easily compatible with any of these methods, but the preferred embodiment is with the tap-and-cycle method as cycling (namely the cycle key) is already used for intuitive text input as well as for symbols and punctuations input, and numerals input.

Character Learning Engine

Digraph association could be further enhanced by making the character library database "learning" as well. This means that whenever a character is selected and accepted by the user, the character moves to the front of the character list for that particular digraph association and keystroke. Thus, for each digraph association with the keystroke, the characters or symbols assigned to the same multi-character key (keystroke), are arranged in the order from most recently used to least recently used or not used (i.e. learning list) for that digraph association, and for which patent rights are hereby claimed.

E.g. 4 Example of how the learning engine works for a VM QWERTY reduced keyboard system.

Assume that the character assignments for the multi-character keys are

Key1—QWERT
Key2—YUIOP
Key3—ASDFG
Key4—HJKL
Key5—ZXCV
Key6—BNM

Assume that the character list corresponding to the digraph association for Key1 and the previous input character "a" is:

| Digraph Association | Characters |
|---|---|
| a, Key1 | r\|t\|q\|e\|w |

When a user selects and inputs the character "a" followed by pressing Key1, the character "r" would be selected and displayed first. If the user cycles to the next character "t" and accepts it by pressing any multi-character key, spacebar, symbol, punctuation or inputting any character, characters, word, numeral or object. The character "t" would then be moved to the front of the character list corresponding to the digraph association and keystroke. In this case the character list corresponding to the digraph association for Key1 and the previous input character "a" would now be re-ordered to:

| Digraph Association | Characters |
|---|---|
| a, Key1 | t\|r\|q\|e\|w |

Setting-Up the Digraph Association Character Library Database

To optimise the power in using digraph association, the character library database for digraph association could be easily set-up in the beginning, before the learning engine sets in, by arranging the characters in the character list in order of most commonly used character to least commonly used, for all characters in the language. This most common letter used list could be obtained easily in any preferred or referenced statistic. By using a simple common letter used list to set-up the database, the process of setting-up the database would be made very simple, fast and effective as all character list related to the same multi-character key would be the same, regardless of digraph association. Digraph association will be optimised later with the character learning engine.

An example of the characters in the English language (QWERTY) arranged in order of most commonly used character to least commonly used character could be:
E,T,A,O,I,N,S,H,R,D,L,C,U,M,W,F,G,Y,P,B,V,K,J,X,Q,Z For setting-up the digraph association character library database, there is no difference in the ordering of the character list assigned to a multi-character key, between the different digraph associations with the same multi-character key. All of the characters or objects in the character list will be initially ordered from most commonly used character or object in the language to least commonly used character or object in the language.

Prior art methods that look into prefix association, as disclosed in U.S. Pat. No. 6,219,731, are tied very much to mathematical statistics and probability, and also linked to various levels of prefix association and even positional considerations. All of these increase the burden for storage of the database, as well as the logic employed to utilise and to set-up the database. The present invention simplifies and optimises the entire process for both usage and set-up, by having the character library database tied to only digraph association (level 1 prefix) and ordered from most recently used to least recently used or not used (i.e. learning list), by means of a character learning engine. In the preferred embodiment, the character library database not only retains the very powerful predictive nature of digraph association, but is also capable of being improved with every usage and/or personalised to the user by means of the character learning engine without any heavy emphasis on statistics, probability or permutation.

E.g. 5 Example of how the character library database, for digraph association, could be set-up for a VM QWERTY reduced keyboard system.

Assume that the character assignments for the multi-character keys are
Key1—QWERT
Key2—YUIOP
Key3—ASDFG
Key4—HJKL
Key5—ZXCV
Key6—BNM Assume that the most common used letter arranged to the least common used letter is:
E,T,A,O,I,N,S,H,R,D,L,C,U,M,W,F,G,Y,P,B,V,K,J,X,Q,Z Since for the set-up, the character list is only dependent on the character assignment to the multi-character keys and the commonness of the characters, and not to the digraph association, the initial digraph association character library database would like (where "|" are separators):

| Digraph Association | Characters |
|---|---|
| a, Key1 | e\|t\|r\|w\|q |
| a, Key2 | o\|i\|u\|y\|p |
| a, Key3 | a\|s\|d\|f\|g |
| a, Key4 | h\|l\|k\|j |
| a, Key5 | c\|v\|x\|z |
| a, Key6 | n\|m\|b |
| b, Key1 | e\|t\|r\|w\|q |
| b, Key2 | o\|i\|u\|y\|p |
| ., . . . | . . . |
| ., . . . | . . . |
| ., . . . | . . . |
| z, Key5 | c\|v\|x\|z |
| z, Key6 | n\|m\|b |

First Character of a Word

For the first character of a word inputted in predictive non-intuitive text mode, there are no digraph association as there is no previous character inputted.

In the character library database, the character list, for first characters of a word, are indexed to keystrokes only (no digraph association) as per their assignment to their multi-character keys. In the preferred embodiment of the reduced keyboard system, character lists with digraph association are learning lists while character lists without digraph association (e.g. first characters of a word) are fixed lists (see section Cycle and Lists).

The character library database, for first character of a word, is built from a first letter frequency list, comprising of all the characters in the language and how common or frequently they are used as the first character of a word, and the character assignments to the multi-character keys. The first letter frequency list could be easily obtained in any preferred or referenced statistic.

An example of the characters in the English language (QWERTY) arranged in order of most commonly used first character of a word could be:
T, O, A, W, B, C, D, S, F, M, R, H, I, Y, E, G, L, N, Q, U, J, K, P, V, X, Z E.g. 6 Example of how the character library database, for first character of a word, could be built for a VM QWERTY reduced keyboard system.

Assume that the character assignments for the multi-character keys are
Key1—QWERT
Key2—YUIOP
Key3—ASDFG
Key4—HJKL
Key5—ZXCV
Key6—BNM Assume that the most common used first letter of a word arranged to the least common used first letter of a word is:

T, O, A, W, B, C, D, S, F, M, R, H, I, Y, E, G, L, N, Q, U, J, K, P, V, X, Z

The character library database, for first character of a word, would look like (where "|" are separators):

| Keystroke | Characters |
|---|---|
| Key1 | T|W|R|E|Q |
| Key2 | O|I|Y|U|P |
| Key3 | A|D|S|F|G |
| Key4 | H|L|J|K |
| Key5 | C|V|X|Z |
| Key6 | B|M|N |

Because the character list for the first character of a word, is a fixed list, first characters that are inputted using predictive non-intuitive text input method, and that are relatively less common first characters of a word like "q" and "z" would require three or more presses of the cycle key. Alternatives to the tap-and-cycle method could be employed, like the two stroke interpretation, for the first character of a word input, which limits the maximum number of keystrokes to identify an unambiguous character to two strokes, with the first keystroke selecting the character list and the second keystroke identifying the actual character in the character list. The preferred embodiment of the reduced keyboard system is for only the tap-and-cycle method to be implemented, as this reduces the learning curve and confusion for the user, and since cycling is already implemented throughout the system, the tap-and-cycle method is thus much more in synch with the reduced keyboard system than any other unambiguous text input method.

Predictive Non-Intuitive Text Input Method

Whenever a new word that does not exist in the current library is required to be entered, or should the user choose not to use the word library database, the user will need to switch to predictive non-intuitive text input mode. This is done simply by pressing-and-holding the predictive non-intuitive mode assigned key. To switch back to intuitive text input mode, press-and-hold the same key again.

The concept, as shown in FIG. 11 by using multi-character keys to represent several characters (letters), a user need only press the key 400 that contains the letter he wants and the predictive database engine will pick the first character that is indexed to the keystroke 404, from a built character library database 406 and if the first choice of letter is not the correct one, to cycle 402 through the other letter choices by using the same cycling key or reverse cycling key (or key combination) used in intuitive text input mode. This is as per the tap-and-cycle method. The strength of this design is that the user need not be worried that the next letter is assigned to the same multi-character key. The user simply types one multi-character key, cycles with cycle key or reverse cycle key (or key combination) if necessary, and types another multi-character key, be it the same multi-character key or another, cycle and repeat. An option to assist the cycling through a list of choices would be to display all the objects associated with the digraph association as a selection or hint list 410.

The character selected and displayed 408 for the user for a multi-character keystroke, is predicted by the predictive database engine, and is derived from the first character of a word character library or the digraph association character library, depending if the character inputted is the first character of a word or not. The character library database engine searches the appropriate library, indexes to the corresponding keystroke 404 or digraph association 406 and displays the first object or character in the corresponding character list 408.

E.g. 7 Example of how the word "abba" is typed in predictive non-intuitive text input mode.

Assume that the character assignments for the multi-character keys are

Key1—QWERT
Key2—YUIOP
Key3—ASDFG
Key4—HJKL
Key5—ZXCV
Key6—BNM

Assume that the character library database, for first character of a word, to be (where "|" are separators):

| Keystroke | Characters |
|---|---|
| Key1 | T|W|R|E|Q |
| Key2 | O|I|Y|U|P |
| Key3 | A|D|S|F|G |
| Key4 | H|L|J|K |
| Key5 | C|V|X|Z |
| Key6 | B|M|N |

Assume that the digraph association for the preceding (previous input) characters "a" and "b" to be (where "|" are separators):

| Digraph Association | Characters |
|---|---|
| a, Key1 | r|t|q|e|w |
| a, Key2 | i|u|y|p|o |
| a, Key3 | d|s|a|f|g |
| a, Key4 | h|l|k|j |
| a, Key5 | z|c|v|x |
| a, Key6 | n|m|b |
| b, Key1 | r|e|t|w|q |
| b, Key2 | o|i|u|p|y |
| b, Key3 | a|s|d|f|g |
| b, Key4 | h|l|k|j |
| b, Key5 | c|v|x|z |
| b, Key6 | n|m|b |

User Presses Key3:

Since this is the first character of a word 426 as shown in FIG. 11, the first character of a word character library is used and the first object cross-referenced to the keystroke Key3 is the character "a" Display shows "a" (cycling is possible but since this is the character the user wants, the user goes on to type the next character)

User Presses Key6 (Total Key3, Key6):

Since this is not the first character of a word, the digraph association character library is used and the first object cross-referenced to the digraph association a, Key6 is the character "n"

Display shows "an" (cycling is possible)

User presses cycle key once

Display shows "am" (cycling is possible)

User presses cycle key again

Display shows "ab" (cycling is possible. Cycling another time will cause the characters "an" to be displayed again but since this is the character the user wants, the user goes on to type the next character)

User Presses Another Key6 (Total Key3, Key6, Cycle, Cycle, Key6):

Since the character "b" (for the previous character input) is selected 420 and accepted (by inputting another (this) character) 422 as shown in FIG. 11 in the character list corresponding to the digraph association for Key6 and the previous input character "a" (i.e. a, Key6), the character list for the digraph association is now reordered 418 by the character learning engine from

| A, Key6 | n\|m\|b |
|---|---|
| to | |
| a, Key6 | b\|n\|m | as character "b" is now the most recently used character in the character list for the digraph association a, Key6.

Since this input is not the first character of a word, the digraph association character library is used and the first object cross-referenced to the digraph association b, Key6 is the character "n"
Display shows "abn" (cycling is possible)
User presses cycle key once
Display shows "abm" (cycling is possible)
User presses cycle key again
Display shows "abb" (cycling is possible. Cycling another time will cause the characters "abn" to be displayed again but since this is the character the user wants, the user goes on to type the next character)

User Presses Key3 (Total Key3, Key6, Cycle, Cycle, Key6, Cycle, Cycle, Key3):

Since the character "b" (for the previous character input) is selected and accepted (by inputting another (this) character) in the character list corresponding to the digraph association for Key6 and the previous input character "b" (i.e. b, Key6), the character list for the digraph association is now reordered by the character learning engine from

| b, Key6 | n\|m\|b |
|---|---|
| to | |
| b, Key6 | b\|n\|m | as character "b" is now the most recently used character in the character list for the digraph association b, Key6.

Since this input is not the first character of a word, the digraph association character library is used and the first object cross-referenced to the digraph association b, Key3 is the character "a" Display shows "abba" (cycling is possible).

User presses spacebar 430 as shown in FIG. 11 to accept a word.

If the user inputs the word "abba" again using predictive non-intuitive text input, the keystroke sequence would then be Key3, Key6, Key6, Key3 (total of four keystrokes) compared to the first time which was Key3, Key6, Cycle, Cycle, Key6, Cycle, Cycle, Key3 (total of eight keystrokes), because of the reordering of the character lists for the two digraph associations by the character learning engine (provided that no further reordering was done to the two digraph associations).

Behind the simple concept is a powerful predictive database engine that enhances the performance of the reduced keyboard system and predictive non-intuitive text input.

Predictive Character Database Engine (Predictive Non-Intuitive Text Input Mode)

Note that the predictive character database engine could be the same database engine as the intuitive word database engine, but just described or termed differently because of the differences in nature of its tasks and functions. In the preferred embodiment they are both referring to the same engine, collectively called the database engine or intuitive database engine.

Predictive non-intuitive text input mode is used when a user is typing words that are not in the word library database. In this mode, the character library database is used instead of the word library database. The user types in the word by typing characters unambiguously through a method know as tap-and-cycle. When a user presses a multi-character key, only the characters assigned to the multi-character key will be presented to the user. The power of the predictive engine is that it can predicatively deduce which character(s) to be presented to the user first, unlike most unambiguous multi-character text input methods that always present the character list in a fixed order.

The disadvantage of a predictive engine behind unambiguous multi-character text input is that touch typing is not fully possible, but the huge reduction in key presses will more than outweigh the deficiency of the ability to touch type.

The predictive character database engine performs the prediction deduction by arranging the list of characters assigned to a multi-character key, in an order dependent on the digraph association of the characters assigned to the multi-character key and the preceding (previous inputted) character. The order of characters is in the order from most recently used after the preceding character to least recently used or not used following the preceding (previous inputted) character (i.e. learning list). This significantly reduces the number of times users need to cycle and also the amount of characters they need to cycle through to reach the character they want. Thus, making non-intuitive text input mode typing predictive. Digraph association works because among all the characters assigned to a multi-character key, some of the characters are more likely to proceed after a previous inputted character than the others, and this likelihood is constantly updated by the database engine.

In the preferred embodiment, before any digraph association is learnt, the database engine arranges the character list of each multi-character key and its digraph associations, based on any statistical analysis of the characters usage for that particular language (e.g. English for QWERTY keyboard), from the most commonly used to the least commonly used.

When no digraph association is present (e.g. first character of a word), the database engine arranges the character list of each multi-character key, based on any statistical analysis of the characters usage for that particular language (e.g. English for QWERTY keyboard) from the most common first letters of words to the least common first letters of words.

When a character, word, or plurality of objects is formed in predictive non-intuitive text input mode, by typing a non-textual character or inputting an auxiliary function like spacebar or carriage return, the database engine will check to see if the character, word or plurality of objects is present in the word library. If the word does not exist in the word library, the new word could be automatically added to the word library and the new word will be thereafter present in the word library database.

All these designs and processes help make predictive non-intuitive text input faster, more user friendly, and even predictive.

Admittedly, predictive non-intuitive text input is much slower than intuitive text input, but the occurrence and necessity of non-intuitive mode typing is minimal and one-time only as the word will be captured in the library and made available in intuitive text input mode the next time round.

Word Library Growth and Control

When a new word is typed and accepted in predictive non-intuitive text input mode, it could be automatically added to the word library. The database engine first, checks to see if the keystroke sequence corresponding to the new word already exists in the word library database. If the keystroke sequence already exists, then it checks to see if the word is currently residing in the word library database. If the word already exists, then nothing else is done. If the word does not exist 423 as shown in FIG. 11 as one of the objects, corresponding to the keystroke sequence, in the word library, the new word is then added to the front of the list of objects 425 and would be selected and displayed first when next the keystroke sequence is inputted in intuitive text input mode. If no keystroke sequence, corresponding to the new word, exists in the word library database, a new unique keystroke sequence is then created in the word library database with the new word as the first object the index key (i.e. unique keystroke sequence) contains.

Because the word library database may not be able to expand indefinitely, some form of control may be necessary to keep the word library database to a manageable or practical size. There are a few methods to this like keeping track on how frequently each word in the library is being used and delete the least used word first so that another word could be added. This will necessitate additional information to be kept in the word library database and will increase the memory storage requirements as well as processing requirements. For the preferred embodiment of the reduced keyboard system, a limit could first be set to the number of words that could be added to the word library database. If the number is about to be exceeded, then the database engine would search for the unique keystroke sequence with the most objects, and delete the last object associated with the keystroke sequence (least recently used word for that keystroke sequence), so that the new word could be saved, recorded or stored into the word library database.

Half-Decimal System

A half-decimal system is where the full decimal representation (0, 1, 2, 3, 4, 5, 6, 7, 8, 9) is represented with half the number of keys. Thus, five keys are all that is needed to represent the ten numerals. Each of the five keys would represent two values. The first numeral value is from 1 to 5, while the second numeral value is from 6 to 0 respectively. The pairing of the two numerals is based on a simple principle of adding 5 to the first value the key represents, where the value 10 is reduced to represent the numeral 0. The numerals database would thus look something like (where "|" are separators):

TABLE 3

| Keystroke | Numerals |
|-----------|----------|
| Key1 | 1\|6 |
| Key2 | 2\|7 |
| Key3 | 3\|8 |
| Key4 | 4\|9 |
| Key5 | 5\|0 |

Since there are six multi-character keys in the VM reduced keyboard system and eight multi-character keys in the FM reduced keyboard system, five of the multi-character keys are assigned two numeral values as per Table 3. The first numeral values are selected and displayed when the multi-character keys are pressed in numerals input mode. To select the alternate numeral values, an auxiliary key like the shift is used in tandem with the multi-character key press or the cycle key could be used.

Arrangement of Numeral Assigned Keys

The choice of which multi-character keys to be assigned what pair of numeral values is preferably based on achieving an orderly arrangement, intuitiveness and ease of use. An optional assignment of the numeral 0 to a sixth multi-character key could also be implemented to facilitate the use (press only one key instead of two keys in tandem or cycling) of the very popular numeral.

Figure 5:
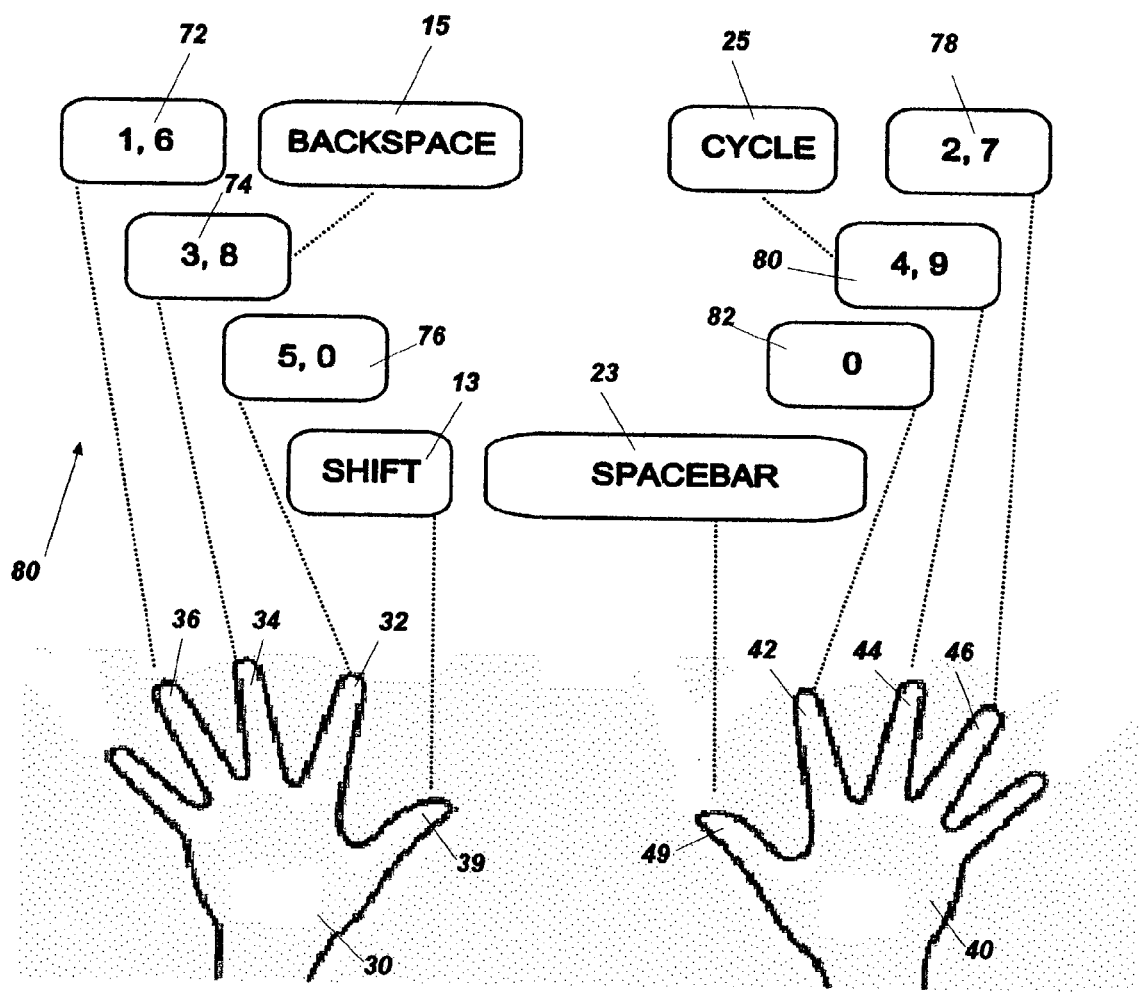
FIG. 5 shows how the numerals for a half-decimal system could be assigned to five of the six multi-character keys for a visual mapping reduced keyboard system together with an additional assignment of numeral 0 to another multi-character key in accordance with an embodiment of the invention.
Figure 6:
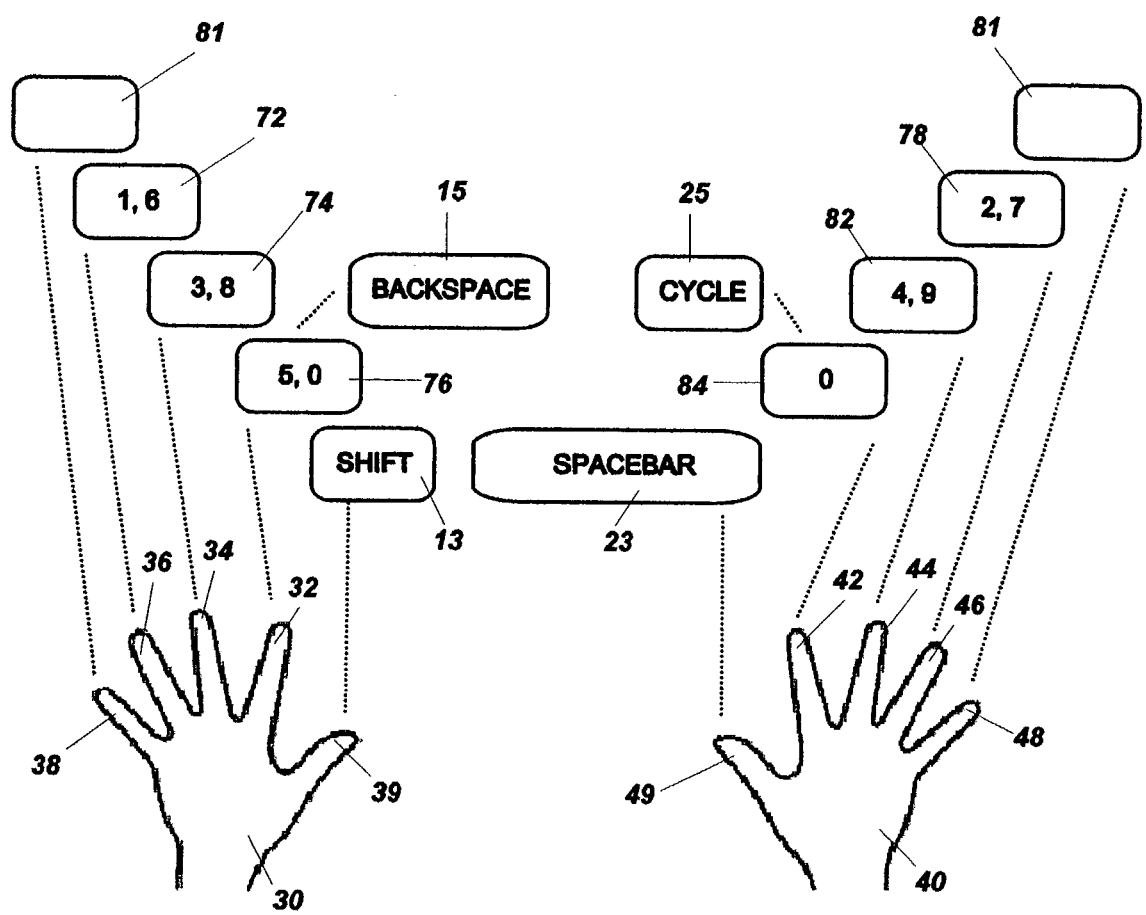
FIG. 6 shows how the numerals for a half-decimal system could be assigned to five of the eight multi-character keys for a finger mapping reduced keyboard system together with an additional assignment of numeral 0 to another multi-character key in accordance with an embodiment of the invention.

FIG. 5 shows how the numerals for a half-decimal system 80 could be assigned to five of the six multi-character keys for a VM reduced keyboard system together with an additional assignment of numeral 0 to another multi-character key 82. FIG. 6 shows how the numerals for a half-decimal system could be assigned to five of the eight multi-character keys for a FM reduced keyboard system together with an additional assignment of numeral 0 to another multi-character key 84.

Practically, the reduced keyboard system is not restricted to only using the half-decimal system, especially for implementation on devices or apparatus that are heavy on numeral pad usage like the mobile phone. In such cases, extra buttons or keys could be fitted or implemented to cater for a full range of numerals, achieving the full range from 0 to 9 with just a single keystroke.

Numerals Input Mode

To input numbers, a user will need to switch to the numerals input (num lock) mode. This is done simply by pressing-and-holding the numerals mode assigned key. To switch back to text input mode, press-and-hold the same key again.

In numerals input mode, the user just needs to press the numeral assigned multi-character keys for 1 to 5 once to unambiguously select and display the numeral. To select and display the numerals 6 to 0, the user will need to press-and-hold the shift key and press the respective numeral assigned multi-character keys at the same time (together), or use the cycle key. Alternatively, if the numeral 0 is assigned to a $6^{th}$ multi-character key, selecting and displaying the numeral 0 only requires pressing the numeral assigned multi-character key once.

Symbols and Punctuations

Symbols and punctuations are selected and displayed by pressing the shift key and cycle key together. The preferred embodiment of the reduced keyboard system will contain two different symbols database, one for text input and another for numerals input. The reason for having two symbols database is because both text input and numerals input modes use different sets of symbols and punctuations and different frequencies of the said symbols and punctuations. Thus, the symbols in the symbols database for text input will be arranged in the order from most used symbol or punctuation for text input to least used symbol or punctuation for text input. Respectively, the symbols in the symbols database for numerals input will be arranged in the order from most used symbol or punctuation for numerals input to least used symbol or punctuation for numerals input. Both symbols database are preferred to be fixed lists (see section Cycle and Lists). The symbols and punctuations frequency list for both text input and numerals input could be obtained in any preferred or referenced statistic.

Examples of what the symbols database, for both text input and numerals input, could contain and their respective ordering of objects can be found in Cycle and Lists. On pressing the shift key and cycle key together, the first object in the appropriate symbols database will be selected and displayed. A user can cycle through the symbols and punctuations list by pressing the cycle key or reverse cycle key (or key combination). Typing any characters, numerals, spacebar or even another symbol or punctuation (by pressing the shift key and cycle key together again) will accept the symbol or punctuation and normal typing is resumed.

Some design factors taken into consideration for the modern keyboards was to include fast fluid text input using a reduced keyboard system, so as to fit into smaller mobile devices like handhelds, PDAs, mobile phones and pocket PCs. Further user requirements include fast adoption and thus a low learning curve, and be QWERTY or QWERTY-type compatible, which includes keyboards in other languages for example keyboards for the French and the German languages. Because of the increase in demand for extended textual input, the reduced keyboard system may be provisioned for two handed or two thumbed typing (to send text messages everywhere and on the go even when there are no places to lay down the keyboard) to facilitate speedy and extended usage.

The reduced keyboard system is also designed for fast typing with two hands or two thumbs for application in mobile devices, mobile phones, handhelds, PDAs and pocket computers, and the ten key design is adapted especially for implementation on more advanced input devices, like a glove entry system or an optical pad entry system.

To make the reduced keyboard system easy to learn and QWERTY or QWERTY-type compatible, it uses the same memory mapping as per the usage of a conventional keyboard. Thus, the reduced keyboard system either uses the same visual mapping (same relative physical location of the character keys) of the conventional keyboard or the same finger mapping (i.e. for touch typing) of the conventional keyboard.

For the ten keys, visual mapping, reduced keyboard system, six of the keys are used for character assignments. Each of the keys represents a section of a conventional keyboard divided into six sections. Each row of the conventional keyboard composes of two sections by dividing the row in the centre and splitting it into two sections per row. Since the character keys in a conventional keyboard occupy three rows, thus six sections are derived from this visual bisecting of the conventional keyboard.

The six keys are further arranged in the same mapping as the divided sections on the conventional keyboard (i.e. in two columns and three rows). The columns could either be straight or angled (more ergonomically arranged), and situated to be used by the middle three fingers of both hands or by two thumbs, one hand per column.

Five of the six keys are further assigned numerals in a half-decimal system. This means that they are assigned two numerals, one is a base from 1 to 5 and another is the base plus 5, with 10 being 0. The alternative number is selected by a tap-and-cycle method (e.g. Cycle key) or using a separate auxiliary key in tandem with the assigned key (e.g. Shift key). Thus, the numerals from 0 to 9 are fully represented on the reduced keyboard system.

The six keys are still further assigned mode changing functions, like caps mode, predictive non-intuitive text input mode and numerals input mode, which are activated by pressing-and-holding the assigned keys.

For the twelve keys, finger mapping, reduced keyboard system, eight of the keys are used for character assignments. Each of the keys represents the same characters assigned to the fingers for touch typing on a conventional keyboard. In touch typing, the keyboard is mapped to eight fingers, thus eight keys are used to represent the characters in the finger map.

The eight keys are further arranged in the same resting placing (home keys) of the fingers for touch typing on the conventional keyboard (i.e. one row or one row in two halves). The row could either be straight or v-shaped (more ergonomically arranged), and situated to be used by the four fingers of both hands or by two thumbs, one hand on each side of the row. The row need not be continuous and can be separated to be more easily accessible by both hands (i.e. one row in two columns).

Five of the eight keys are further assigned numerals in a half-decimal system. This means that they are assigned two numerals, one is a base from 1 to 5 and another is the base plus 5, with 10 being 0. The alternative number is selected by a tap-and-cycle method (e.g. Cycle key) or using a separate auxiliary key in tandem with the assigned key (e.g. Shift key). Thus, the numerals from 0 to 9 are fully represented on the reduced keyboard system.

The eight keys are still further assigned mode changing functions, like caps mode, predictive non-intuitive text input mode and numerals input mode, which are activated by pressing-and-holding the assigned keys.

The reduced keyboard system by using an intuitive database engine resolves the ambiguity of the set of characters that each multifunction key represents, by matching words in a word library which are indexed to a unique keystroke sequence (intuitive text input mode), or characters in a character library which are indexed to a unique keystroke and digraph association (predictive non-intuitive text input mode), using an intuitive database engine.

The intuitive database engine further refines the order of the words stored per unique keystroke sequence, in the word library, by placing the last used or selected word in front (i.e. first in the queue of choice/list of words to be selected).

The intuitive database engine still further refines the order of the characters stored per unique keystroke and digraph association, in the character library, by placing the last used or selected character in front (i.e. first in the queue of choice/list of characters to be selected).

New words inputted using the predictive non-intuitive text input mode, are able to be automatically added to the word library. This capability together with the capability to reorder the words stored per unique keystroke sequence from most recently used to least recently used or not used, enables the intuitive database engine to be constantly learning and personalising itself to the user.

The reduced keyboard system is further enhanced by the inclusion of four keys to represent spacebar, shift, backspace and cycle key.

The spacebar and backspace operates much like the conventional keyboard but with additional features and modes being possible to be activated when pressed-and-held or when used in tandem with the shift key.

The shift key operates much like the conventional keyboard in the capitalisation of characters when used in tandem with a character key, but also as a numeral selector for the half-decimal system and also as a mode changer or performing additional functions when used in tandem with the spacebar, backspace and cycle key. The shift key could also be used to activate new features and modes when pressed-and-held.

The cycle key is used to cycle through a list of choices determined by the intuitive database engine that corresponds to a keystroke sequence (for a word in intuitive text input mode), keystroke and digraph association (for a character in predictive non-intuitive text input mode), keystroke (for a numeral in numerals input mode), and symbols and punctuations keystroke activation (for symbols and punctuations in both text input and numerals input mode).

Figure 9:
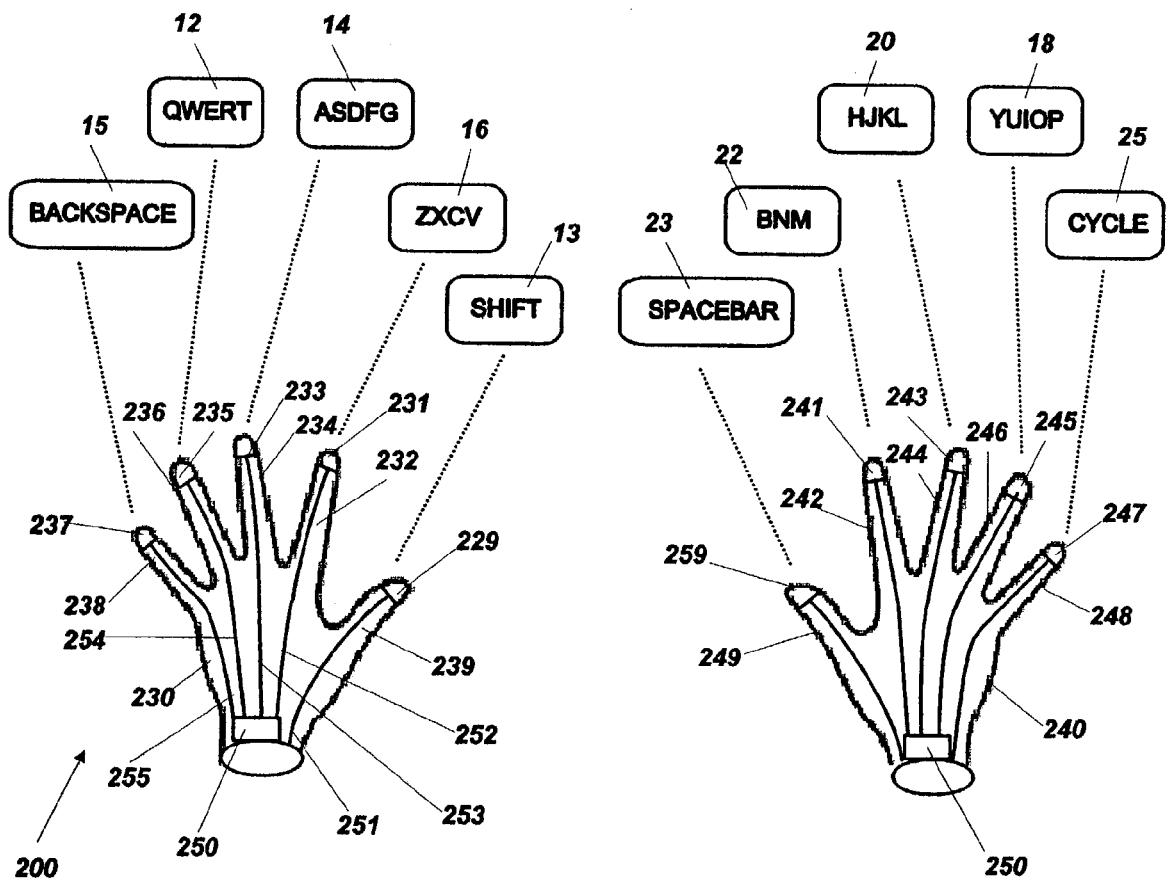
FIG. 9 shows the perspective view of the possible embodiment of a glove input device and display of a text input device in accordance with the present invention, showing an example of how the reduced keyboard system using the visual mapping (ten keys) could be implemented on a glove input device in accordance with an embodiment of the invention.

In view of the above description, the essence of an embodiment of the present invention is to utilise the similar mapping used for typing on the conventional keyboard, be it visual mapping or finger mapping, while recreating the typing feel and speed of conventional keyboard typing, by facilitating double-handed or double-thumbed typing. Although the reference for the reduced keyboard system is mainly to QWERTY and QWERTY-type keyboards, the teachings of the present system could easily be extended to any conventional keyboard (e.g. Dvorak keyboard) that could be reduced to lesser keys, by employing the same visual mapping or finger mapping and key arrangements, and using the intuitive text input and predictive non-intuitive text input methods to resolve the keystrokes or keystroke sequences of the multi-character keys. In this way, the reduced keyboard system is applicable to most languages that can be represented by a conventional keyboard or conventional means of typing. Numerous embodiments of the teachings of the present invention beyond those specifically described here are possible and which do not extend beyond the scope of those teachings, which scope is defined by the appended claims. In particular, applications of the system are not limited to the standard ambiguous code or to applications only in mobile devices or conventional devices requiring text input, but are well suited for other applications and embodiments, even "futuristic" (less conventional) ones like glove text input devices 200, shown in FIG. 9, and optical or movement recognition input devices, or any electronic device requiring a means to input a string of non-random characters. FIG. 9 shows optical or pressure sensors 229, 231, 233, 235, 237, 245, 243, 241, 247, 259 (to pick up signal) on left and right glove 230, 240 of glove fingers 239, 232, 234, 236, 238, 242, 244, 246, 248, 249, respectively. FIG. 9 also shows captured signals that can be transmitted via transmitting means 250, 251, 252, 253, 254, 255, for example wired or wireless methods.

The text input methodology described here may also be mixed-and-matched with other well-known word completion mechanisms to further reduce the number of keystrokes required for some varieties of text input. Additionally, that not all the methodology and mechanisms need be implemented to complete the reduced keyboard system as long as its essence remains and main text input functions are intact, thus allowing for the omission of certain methodologies and mechanisms to reduce cost, software size, implementation requirements and/or even some good-to-have (but not critical) functionalities.

It will be appreciated that, although specific embodiments of the invention have been described herein for purposes of illustration, various modifications may be made without departing from the scope of the invention. Accordingly, the invention is not limited except by the appended claims.

What is claimed is:

1. A reduced keyboard system for inputting information comprising:
    a plurality of keys, each key having at least one feature wherein the feature is a data value, a function or a data symbol representative of a keystroke on a QWERTY-type keyboard wherein the key is assigned a keystroke of a QWERTY-type keyboard based on a mapping arrangement of a section comprised of adjacent keys of a QWERTY-type keyboard compatible with the memory mapping used by a user on a QWERTY-type keyboard;
    a database for storing data wherein the data is a data character or a data symbol associated with an input keystroke sequence of the keys; and
    a display for displaying the information;
    wherein the allocation of numerals is based on a half-decimal system, each numeral assigned a key representing two numerals with one numeral being a base from 1 to 5 and the other numeral being the base plus 5, with 10 being rounded to 0.

2. A reduced keyboard system of claim 1, wherein the data stored is indexed by keystroke sequences, and for each keystroke sequence the data is stored in an order of a most recently selected data to a least recently selected data.

3. A reduced keyboard system of claim 1, wherein the data stored is stored in an order of a most recently selected data to a least recently selected data.

4. A reduced keyboard system of claim 3, wherein the database has a predetermined limit of entries to store the stored data, wherein where a selected new data is to be stored and when the predetermined limit of entries is met the selected new data replaces the least recently selected data stored In the database.

5. A reduced keyboard system for inputting information comprising:
    a plurality of single entry keys, each key having at least two features wherein each feature is a data value, a function or a data symbol representative of a keystroke on a QWERTY-type keyboard assigned based on a mapping arrangement of a section comprised of adjacent keys of the QWERTY-type keyboard, whereby the number of said keys is reduced compared with the QWERTY-type keyboard, and upon depressing each single entry key, first data corresponding to said at least two features is identified;
    a database for storing second data wherein the second data is a data character or a data symbol associated with an input keystroke sequence of the keys;
    a display for displaying the information based on the input keystroke sequence and the associated stored second data;
    a first set of keys within the plurality of keys wherein a feature of each key of the first set of keys is a data value representative of a key-character of a QWERTY-type keyboard; and
    a second set of keys within the plurality of keys wherein a feature of each key in the second set of keys is a function based on auxiliary functions;

wherein the mapping arrangement is based on a visual-mapping arrangement of the QWERTY-type keyboard, the first set having less than seven keys and the second set having at least two keys;

wherein the keys of the first set represent corresponding sections of the QWERTY-type keyboard, wherein the sections on the QWERTY-type keyboard are arranged in less than three columns and at least three rows;

wherein each column is arranged to be accessible by at least one of the fingers of each hand of a user for two hand typing, the first set having:

a first key arranged to be accessible by a first finger of the left hand of a user, the first key having features representing at least the alphabetic characters Q, W, E, R, and T;

a second character key arranged to be accessible by a second finger of the left hand of a user, the second key having features representing at least the alphabetic characters A, S, D, F, and G;

a third character key arranged to be accessible by a third finger of the left hand of a user, the third key having features representing at least the alphabetic characters Z, X, C, and V;

a fourth character key arranged to be accessible by a first finger of the right hand of a user, the fourth key having features representing at least the alphabetic characters Y, U, I, O, and P;

a fifth character key arranged to be accessible by a second finger of the right hand of a user, the fifth key having features representing at least the alphabetic characters H, J, K, and L; and a sixth character key arranged to be accessible by a third finger of the right hand of a user, the sixth key having features representing at least the alphabetic characters B, N, and M.

6. A reduced keyboard system of claim 5, wherein each column is arranged to be accessible by at least one thumb of a user for thumb typing.

7. A reduced keyboard system of claim 5, wherein the data stored is indexed by keystroke sequences, and for each keystroke sequence the data is stored in an order of a most recently selected data to a least recently selected data.

8. A reduced keyboard system of claim 5, wherein the data stored is stored in an order of a most recently selected data to a least recently selected data.

9. A reduced keyboard system of claim 8, wherein the database has a predetermined limit of entries to store the stored data, wherein where a selected new data is to be stored and when the predetermined limit of entries is met the selected new data replaces the least recently selected data stored in the database.

10. A reduced keyboard system for inputting information comprising:

a plurality of single entry keys, each key having at least two features wherein each feature is a data value, a function or a data symbol representative of a keystroke on a QWERTY-type keyboard assigned based on a mapping arrangement of a section comprised of adjacent keys of the QWERTY-type keyboard, whereby the number of said keys is reduced compared with the QWERTY-type keyboard, and upon depressing each single entry key, first data corresponding to said at least two features is identified;

a database for storing second data wherein the second data is a data character or a data symbol associated with an input keystroke sequence of the keys;

a display for displaying the information based on the input keystroke sequence and the associated stored second data;

a first set of keys within the plurality of keys wherein a feature of each key of the first set of keys is a data value representative of a key-character of a QWERTY-type keyboard; and a second set of keys within the plurality of keys wherein a feature of each key in the second set of keys is a function based on auxiliary functions;

wherein the mapping arrangement is based on a visual-mapping arrangement of the QWERTY-type keyboard, the first set having less than seven keys and the second set having at least two keys;

wherein the keys of the first set represent corresponding sections of the QWERTY-type keyboard, wherein the sections on the QWERTY-type keyboard are arranged in less than three columns and at least three rows;

wherein each column is arranged to be accessible by at least one of the fingers of each hand of a user for two hand typing, the first set having:

a first key arranged to be accessible by a first finger of the left hand of a user, the first key having features representing at least the alphabetic characters Q, W, E, R, and T;

a second character key arranged to be accessible by a second finger of the left hand of a user, the second key having features representing at least the alphabetic characters A, S, D, F, and G;

a third character key arranged to be accessible by a third finger of the left hand of a user, the third key having features representing at least the alphabetic characters Z, X, C, V, and B;

a fourth character key arranged to be accessible by a first finger of the right hand of a user, the fourth key having features representing at least the alphabetic characters Y, U, I, O, and P;

a fifth character key arranged to be accessible by a second finger of the right hand of a user, the fifth key having features representing at least the alphabetic characters H, J, K, and L; and a sixth character key arranged to be accessible by a third finger of the right hand of a user, the sixth key having features representing at least the alphabetic characters N and M.

11. A reduced keyboard system of claim 10, wherein each column is arranged to be accessible by at least one thumb of a user for thumb typing.

12. A reduced keyboard system of claim 10, wherein the data stored is indexed by keystroke sequences, and for each keystroke sequence the data is stored in an order of a most recently selected data to a least recently selected data.

13. A reduced keyboard system of claim 10, wherein the data stored is stored in an order of a most recently selected data to a least recently selected data.

14. A reduced keyboard system of claim 13, wherein the database has a predetermined limit of entries to store the stored data, wherein where a selected new data is to be stored and when the predetermined limit of entries is met, the selected new data replaces the least recently selected data stored in the database.

* * * * *